United States Patent
Kim et al.

(10) Patent No.: US 12,547,494 B2
(45) Date of Patent: Feb. 10, 2026

(54) MEMORY CONTROLLERS AND MEMORY SYSTEMS

(71) Applicant: SAMSUNG ELECTRONICS CO., LTD., Suwon-si (KR)

(72) Inventors: Jiho Kim, Suwon-si (KR); Changkyu Seol, Suwon-si (KR); Hyunjung Ko, Suwon-si (KR); Sungrae Kim, Suwon-si (KR); Seonghyeog Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 18 days.

(21) Appl. No.: 18/645,153

(22) Filed: Apr. 24, 2024

(65) Prior Publication Data
US 2025/0181447 A1 Jun. 5, 2025

(30) Foreign Application Priority Data

Nov. 30, 2023 (KR) ........................ 10-2023-0170324

(51) Int. Cl.
*G06F 11/10* (2006.01)

(52) U.S. Cl.
CPC ................................ *G06F 11/1044* (2013.01)

(58) Field of Classification Search
CPC ............. G06F 11/1044; G06F 11/1048; G06F 11/1068; H03M 13/37; H03M 13/616; H03M 13/152; H03M 13/3738
See application file for complete search history.

(56) References Cited

U.S. PATENT DOCUMENTS

| | | | |
|---|---|---|---|
| 7,389,465 B2 | 6/2008 | Radke et al. | |
| 7,496,826 B2 | 2/2009 | Holman | |
| 8,196,011 B2 | 6/2012 | Izumita et al. | |
| 11,115,058 B2 | 9/2021 | Yoshida et al. | |
| 11,404,136 B2 | 8/2022 | Amato et al. | |
| 11,463,110 B2 | 10/2022 | Kim et al. | |
| 2014/0173377 A1* | 6/2014 | Horisaki | G06F 11/1048 |
| | | | 714/755 |
| 2020/0241956 A1* | 7/2020 | Son | G06F 3/065 |
| 2021/0019225 A1* | 1/2021 | Oh | G06F 11/1048 |

FOREIGN PATENT DOCUMENTS

| | | |
|---|---|---|
| JP | 2691972 | 12/1997 |
| JP | 3879082 | 2/2007 |

* cited by examiner

*Primary Examiner* — Shelly A Chase
(74) *Attorney, Agent, or Firm* — Fish & Richardson P.C.

(57) ABSTRACT

A memory controller to control a memory module including data chips and a parity chip, includes an error correction code (ECC) engine. The ECC engine includes an ECC decoder to perform a first ECC decoding to correct a symbol error in a read codeword set and perform a second ECC decoding to correct multi-bit error and to detect triple-bit error in the read codeword set in parallel with performing the first ECC decoding. The ECC decoder generates a syndrome including a first sub syndrome, a second sub syndrome and a third sub syndrome, corrects the symbol error, and corrects the multi-bit error and detect the triple bit error.

20 Claims, 29 Drawing Sheets

FIG. 8B

ISM11

$$\begin{pmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{pmatrix}$$

with height $h$ and width $h$.

ZSM11

$$\begin{pmatrix} 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{pmatrix}$$

with height $h/2$ and width $h$.

FIG. 9A $$R = \{r_0, r_1, r_2, r_3, \cdots, r_{N-1}\}^T$$

| DS | | RESULT |
|---|---|---|
| EF1 | EF2 | |
| 0 | 01 | UE |
| 0 | 10 | 2-BIT CORRECTION |
| 0 | 11 | 3-BIT DETECTION |
| 1 | 01/10/11 | SYMBOL CORRECTION |

MEMORY CONTROLLERS AND MEMORY SYSTEMS

CROSS-REFERENCE TO RELATED APPLICATION

This US non-provisional application claims priority under 35 U.S.C. § 119 to Korean Patent Application No. 10-2023-0170324, filed on Nov. 30, 2023, in the Korean Intellectual Property Office, the disclosure of which is incorporated herein by reference in its entirety.

BACKGROUND

A memory device may be implemented using a semiconductor, such as silicon (Si), germanium (Ge), gallium arsenide (GaAs), indium phosphide (InP), or the like. Memory devices are typically divided into volatile memory devices and nonvolatile memory devices.

A volatile memory device refers to a memory device in which stored data is lost when a power supply is shut down. On the other hand, a nonvolatile memory device refers to a memory device that retains stored data when a power supply is shut down. Because a dynamic random access memory (DRAM), which is a type of volatile memory device, has a high access speed, the DRAM is widely used as a working memory, a buffer memory, a main memory, or the like of a computing system. In addition, a plurality of volatile memory devices may be provided in the form of memory modules for a relatively large storage capacity. Accordingly, research is being conducted for correcting errors occurring in the memory module efficiently.

SUMMARY

In general, in some aspects, the present disclosure is directed toward a memory controller capable of correcting errors occurring in a memory module, efficiently.

In general, according to some aspects of the present disclosure, a memory controller to control a memory module includes a plurality of data chips and at least one parity chip, includes an error correction code (ECC) engine and a processor to control the ECC engine. The ECC engine includes an ECC decoder to perform a first ECC decoding to correct a symbol error in a read codeword set read from the memory module by using a first sub check matrix and a second sub check matrix of a parity check matrix and perform a second ECC decoding to correct multi-bit error and to detect triple-bit error in the read codeword set by using the second sub check matrix and a third sub check matrix of the parity check matrix, in parallel with performing the first ECC decoding. The ECC decoder generates a syndrome including a first sub syndrome, a second sub syndrome and a third sub syndrome based on the parity check matrix and the read codeword set, corrects the symbol error based on comparing the first sub syndrome and the second sub syndrome and corrects the multi-bit error and detect the triple bit error based on a summed value obtained by summing syndrome values of the first sub syndrome.

According to some aspects of the present disclosure, a memory system includes a memory module and a memory controller. The memory module includes a plurality of data chips and at least one parity chip. The memory controller controls the memory module and includes an error correction code (ECC) engine and a processor to control the ECC engine. The ECC engine includes an ECC decoder to correct a symbol error in a read codeword set read from the memory module by using a first sub check matrix and a second sub check matrix of a parity check matrix and perform a second ECC decoding to correct multi-bit error and to detect triple-bit error in the read codeword set by using the second sub check matrix and a third sub check matrix of the parity check matrix, in parallel with performing the first ECC decoding. The ECC decoder generates a syndrome including a first sub syndrome, a second sub syndrome and a third sub syndrome based on the parity check matrix and the read codeword set, corrects the symbol error based on comparing the first sub syndrome and the second sub syndrome and corrects the multi-bit error and detect the triple bit error based on a summed value obtained by summing syndrome values of the first sub syndrome.

According to some aspects of the present disclosure, a memory controller to control a memory module includes a plurality of data chips and at least one parity chip by communicating with one or more host through a compute express link (CXL) interface, includes an error correction code (ECC) engine and a processor to control the ECC engine. The ECC engine includes an ECC decoder to perform a first ECC decoding to correct a symbol error in a read codeword set read from the memory module by using a first sub check matrix and a second sub check matrix of a parity check matrix and perform a second ECC decoding to correct multi-bit error and to detect triple-bit error in the read codeword set by using the second sub check matrix and a third sub check matrix of the parity check matrix, in parallel with performing the first ECC decoding. The ECC decoder generates a syndrome including a first sub syndrome, a second sub syndrome and a third sub syndrome based on the parity check matrix and the read codeword set, corrects the symbol error based on comparing the first sub syndrome and the second sub syndrome and corrects the multi-bit error and detect the triple bit error based on a summed value obtained by summing syndrome values of the first sub syndrome. The first ECC decoding corresponds to Reed-Solomon decoding. The second ECC decoding corresponds to Bose-Chaudhuri-Hocquenghem decoding.

According to some aspects of the present disclosure, the ECC decoder in the memory controller, may perform a first ECC decoding to correct the symbol error in the codeword set read from a memory module and a second ECC decoding to correct the multi-bit error in the codeword set in parallel, and may share a portion of the parity check matrix in performing the first ECC decoding and the second ECC decoding. Accordingly, the ECC engine may reduce complexity of ECC and decoding latency.

BRIEF DESCRIPTION OF THE DRAWINGS

Example implementations will be more clearly understood from the following detailed description taken in conjunction with the accompanying drawings.

FIG. 8B illustrates an example of one of the plurality of identity sub matrixes and one of the plurality of zero sub matrixes in the first sub check matrix in FIG. 8A according to some implementations.

FIG. 9A illustrates an example of a vector representation of the read codeword set in FIG. 6 according to some implementations.

FIG. 9B illustrates an example of a vector representation of the syndrome according to some implementations.

FIG. 17 is a table illustrating that an example of a decision circuit configured to determine an error based on the decision signal according to some implementations.

DETAILED DESCRIPTION

Figure 1:
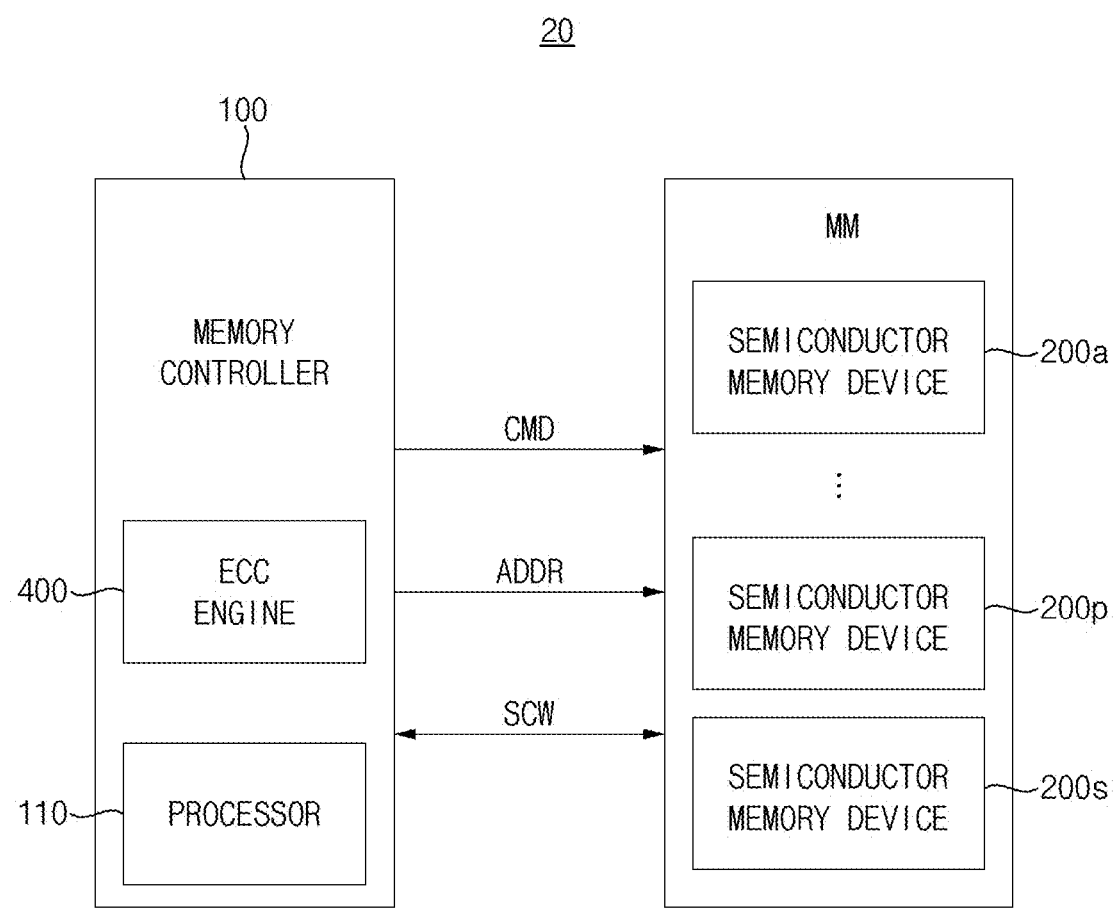
FIG. 1 is a block diagram illustrating an example of a memory system according to some implementations.

Hereinafter, example implementations will be described in detail with reference to the accompanying drawings. Like reference numerals may refer to like elements throughout the accompanying drawings.

FIG. 1 is a block diagram illustrating an example of a memory system according to some implementations. In FIG. 1, a memory system 20 may include a memory controller 100 and a memory module MM. The memory module MM may include a plurality of semiconductor memory devices 200a~200p and 200s. Here, p may be a natural number equal to or greater than four and may be sixteen. Hereinafter, the plurality of semiconductor memory devices 200a~200p and 200s may be referred to as a plurality of memory chips. The plurality of memory chips 200a~200p and 200s may include a plurality of data chips 200a~200p and at least one parity chip 200s.

The memory controller 100 may control an overall operation of the memory system 20. The memory controller 100 may control an overall data exchange between a host and the plurality of memory chips 200a~200p and 200s. For example, the memory controller 100 may write data in the plurality of memory chips 200a~200p and 200s or read data from the plurality of memory chips 200a~200p and 200s in response to a request from the host. In addition, the memory controller 30 may issue operation commands to the plurality of memory chips 200a~200p and 200s for controlling the plurality of memory chips 200a~200p and 200s.

In some implementations, each of the plurality of memory chips 200a~200p and 200s includes volatile memory cells such as a dynamic random access memory (DRAM). In some implementations, a number of the data chips 200a~200p may be 8. However, the number of the data chips 200a~200p is not limited thereto. In some implementations, each of the data chips 200a~200p may be referred to as a data memory, and the at least one parity chip 200s may be referred to as an error correction code (ECC) memory, or a redundant memory.

The memory controller 100 may transmit an address ADDR and a command CMD to the memory module MM and may exchange a codeword set SCW with the memory module MM. The memory controller 100 may include a processor 110 and an error correction code (ECC) engine 400. The processor 110 may control overall operation of the memory controller 100 and may control the ECC engine 400. The ECC engine 400 may perform an ECC encoding on a user data set to generate a parity data and may provide the memory module MM with the codeword set SCW including the user data set and the parity data in a write operation of the memory system 20. The user data set may be stored in the data chips 200a~200p, and the parity data may be stored in the at least one parity chip 200s.

The ECC engine 400, in a read operation, may receive the codeword set SCW from the memory module MM. The ECC engine 400 may include an ECC decoder (refer to 430 in FIG. 2). The ECC decoder 430 may perform a first ECC decoding to correct a symbol error in a read codeword set SCW by using a first sub check matrix and a second sub check matrix of a parity check matrix, may perform a second ECC decoding to correct multi-bit error and to detect triple-bit error in the read codeword set SCW by using the second sub check matrix and a third sub check matrix of the parity check matrix, in parallel with performing the first ECC decoding.

The ECC decoder 430 may generate a syndrome including a first sub syndrome, a second sub syndrome and a third sub syndrome based on the parity check matrix and the read codeword set SCW, may correct the symbol error based on comparing the first sub syndrome and the second sub syndrome and may correct the multi-bit error and detect the triple bit error based on a summed value obtained by summing syndrome values of the first sub syndrome.

Accordingly, the ECC engine 400 may correct the symbol error and multi-bit error rapidly by performing the first ECC decoding and the second ECC decoding in parallel and may reduce ECC decoding latency.

Figure 2:
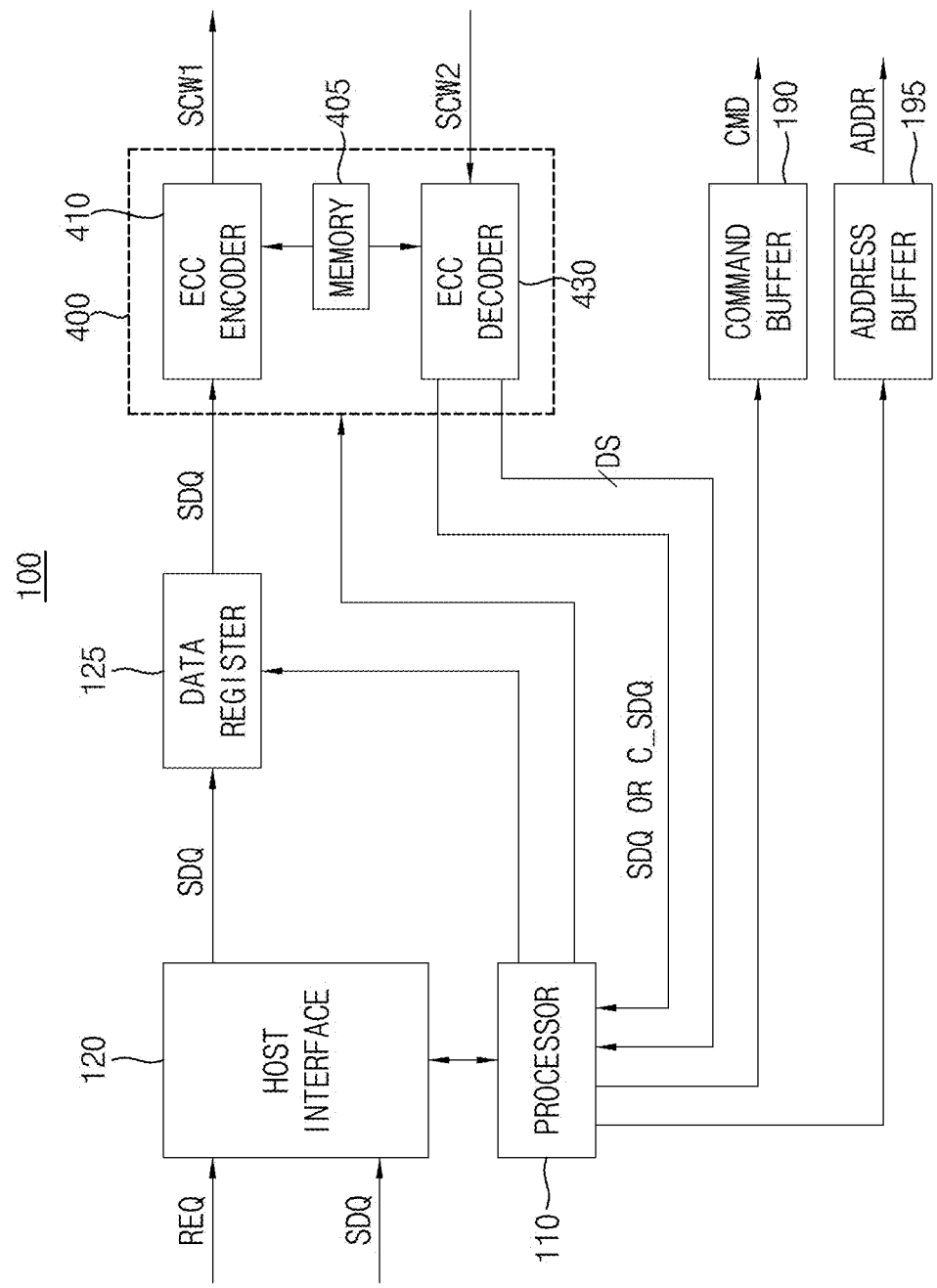
FIG. 2 is block diagram illustrating the memory controller in the memory system of FIG. 1 according to some implementations.

FIG. 2 is block diagram illustrating an example of the memory controller in the memory system of FIG. 1 according to some implementations. In FIG. 2, the memory controller 100 may include the processor 110, a host interface 120, a data register 125, the ECC engine 400, a command buffer 190 and an address buffer 195. The ECC engine 400 may include an ECC encoder 410, an ECC decoder 430 and a memory 405.

The host interface 120 may receive a request REQ and a user data set SDQ from the host, and may provide the user data set SDQ to the data register 125. The data register 125 may provide the user data set SDQ to the ECC engine 400.

The ECC encoder 410 may perform an ECC encoding on the user data set SDQ using a parity generation matrix to generate a parity data and may output a codeword set SCW1 including the user data set SDQ and the parity data.

The ECC decoder 430 may receive a codeword set SCW2 from the memory module MM, may correct the symbol error in the codeword set SCW2, may correct the multi-bit error in the codeword set SCW2 and may detect a triple-bit error in the codeword set SCW2. The ECC decoder 430 may perform a first ECC decoding to correct the symbol error in the codeword set SCW2 by using a first sub check matrix and a second sub check matrix of the parity check matrix, and may perform a second ECC decoding to correct the multi-bit error and to detect the triple-bit error in the codeword set SCW2 by using the second sub check matrix and a third sub check matrix of the parity check matrix, in parallel with performing the first ECC decoding.

The ECC decoder 430 may generate a decision signal DS indicating a result of the first ECC decoding and a result of the second ECC decoding and may provide the decision signal DS to the processor 110.

The result of the first ECC decoding may indicate whether the symbol error is corrected and the result of the first ECC decoding may indicate at least one of whether the multi-bit error is corrected, whether the triple-bit error is detected and whether the single bit error is corrected.

The ECC decoder 430 may provide the processor 110 with one of the user data set SDQ and a corrected user data set C_SDQ by performing the first ECC decoding and the second ECC decoding.

The processor 110 may receive the user data set SDQ or the corrected user data set C_SDQ and may control the ECC engine 400, the command buffer 190 and the address buffer 195. The command buffer 190 may store the command CMD corresponding to the request REQ and may transmit the command CMD to the memory module MM under control of the processor 110. The address buffer 195 may store the address ADDR and may transmit the address ADDR to the memory module MM under control of the processor 110.

Figure 3:
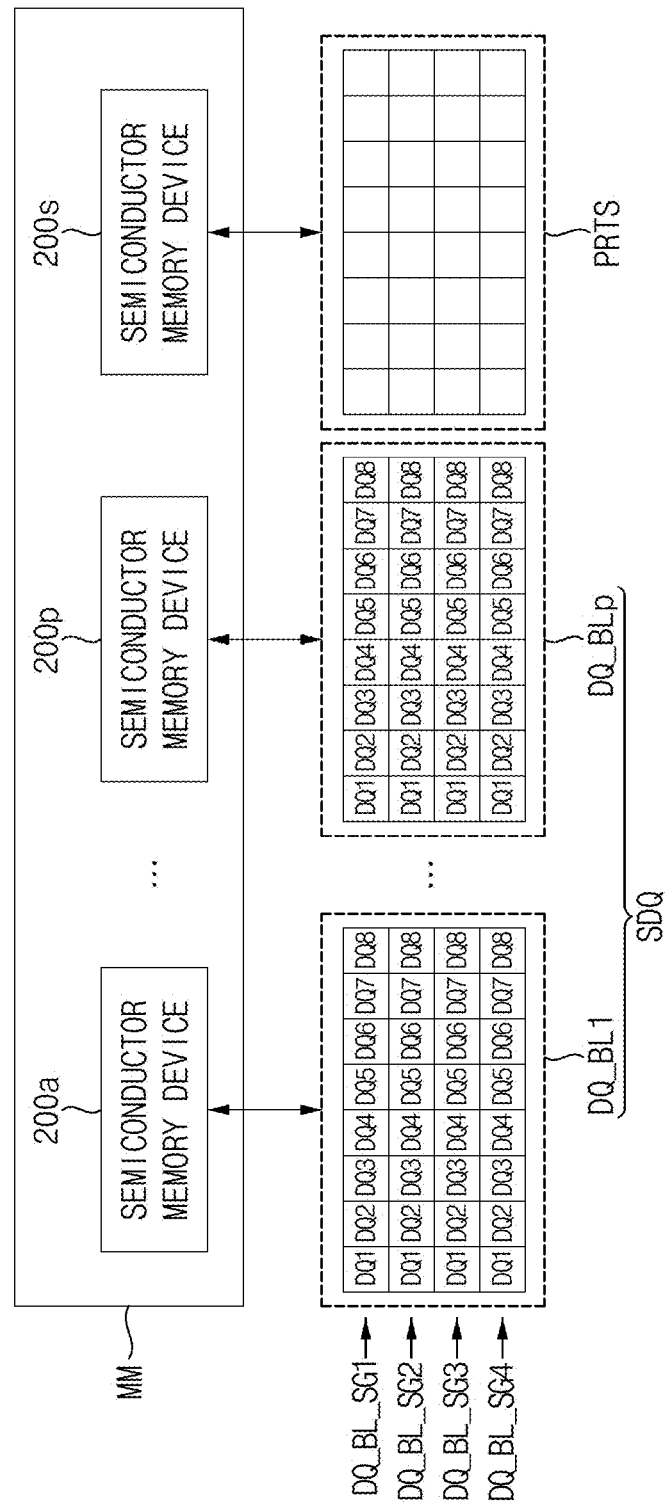
FIG. 3 illustrates examples of data sets corresponding to the plurality of burst lengths in the memory system of FIG. 1 according to some implementations.

FIG. 3 illustrates examples of data sets corresponding to a plurality of burst lengths in the memory system of FIG. 1 according to some implementations. In FIG. 3, each of the data chips 200a~200p and the parity chip 200s may perform a burst operation. Herein, the burst operation refers to an operation of writing or reading a large amount of data by sequentially increasing or decreasing an initial address provided from the memory controller 100. A basic unit of the burst operation may be referred to a burst length BL.

Each of the data sets DQ_BL1~DQ_BLp corresponding to the plurality of burst lengths are input to/output from each of the data chips 200a~200p.

Each of the data sets DQ_BL1~DQ_BLp may include data segments DQ_BL_SG1~DQ_BL_SG4 corresponding to each burst length of the plurality of burst lengths. The data sets DQ_BL1~DQ_BLp may correspond to the user data set SDQ. Each of the data segments DQ_BL_SG1~DQ_BL_SG4 may include data bits DQ1~DQ8.

The burst length is assumed to be 8 in FIG. 3 and it is assumed that the burst operation is performed four times. While the burst operation is performed once in each of the data chips 200a~200p, data bits DQ1~DQ8 are input to/output from each of the data chips 200a~200p and parity data PRTS corresponding to the plurality of burst lengths are input to/output from the parity chip 200s.

Figure 4:
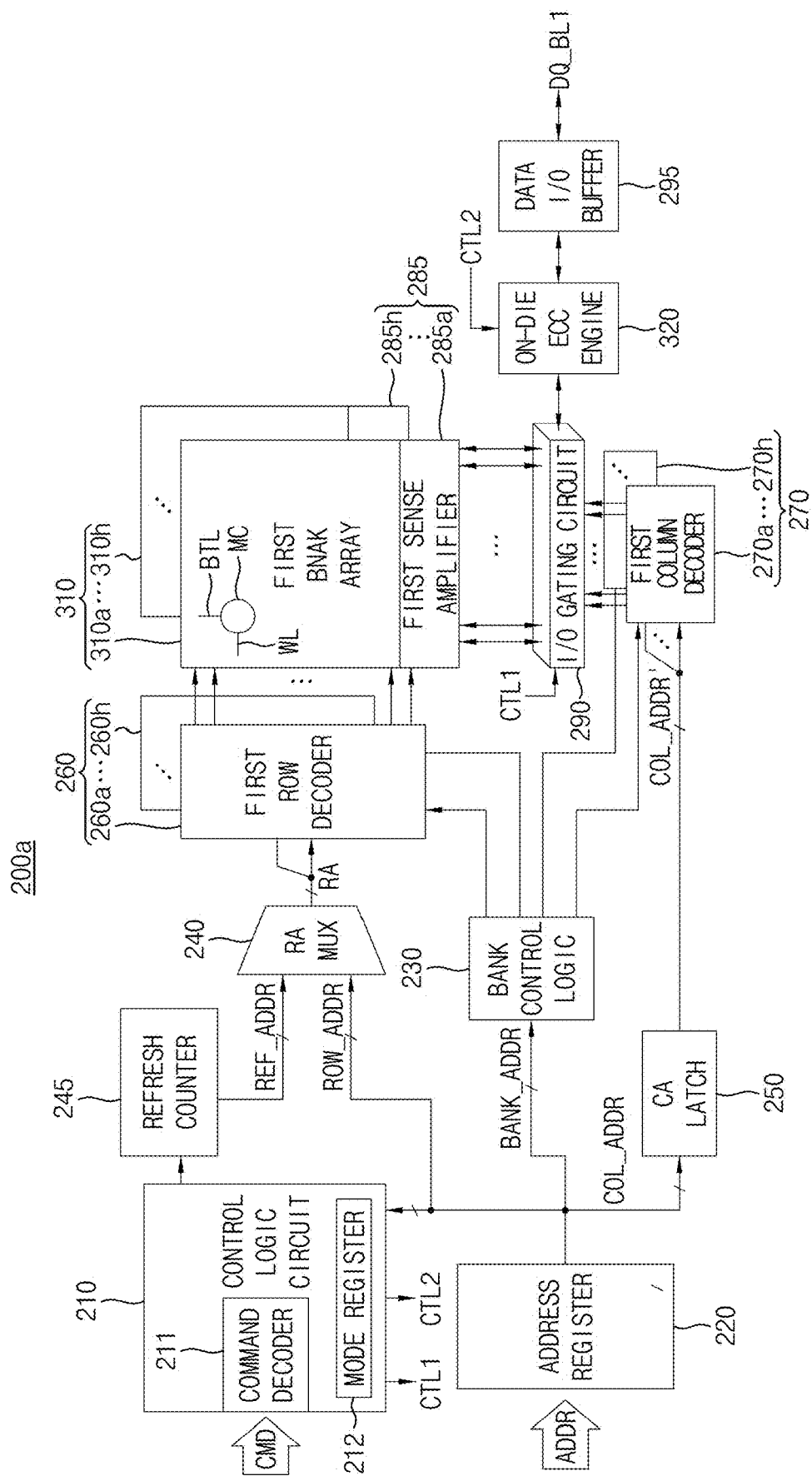
FIG. 4 is a block diagram illustrating an example of one of the data chips in the memory module of FIG. 1 according to some implementations.

FIG. 4 is a block diagram illustrating an example of one of the data chips in the memory module of FIG. 1 according to some implementations. In FIG. 4, it is assumed that each of the data chips 200a~200p in FIG. 1 employs a volatile memory device.

Referring to FIG. 4, the data chip 200a may include a control logic circuit 210, an address register 220, a bank control logic circuit 230, a row address multiplexer (RA MUX) 240, a column address (CA) latch 250, a row decoder 260, a column decoder 270, a memory cell array 310, a sense amplifier unit 285, an input/output (I/O) gating circuit 290, an on-die ECC engine 320, a data input/output (I/O) buffer 295 and a refresh counter 245. The memory cell array 310 may include first through eighth bank arrays 310a~310h.

The row decoder 260 may include first through eighth row decoders 260a~260h coupled to the first through eighth bank arrays 310a~310h, respectively, the column decoder 270 may include first through eighth column decoders 270a~270h coupled to the first through eighth bank arrays 310a~310h, respectively, and the sense amplifier unit 285 may include first through eighth sense amplifiers 285a~285h coupled to the first through eighth bank arrays 310a~310h, respectively.

The first through eighth bank arrays 310a~310h, the first through eighth row decoders 260a~260h, the first through eighth column decoders 270a~270h, and the first through eighth sense amplifiers 285a~285h may form first through eighth banks. Each of the first through eighth bank arrays 310a~310h may include a plurality of word-lines WL, a plurality of bit-lines BTL, and a plurality of memory cells MC formed at intersections of the word-lines WL and the bit-lines BTL.

Although the data chip 200a is illustrated in FIG. 4 as including eight banks, the data chip 200a may include any number of banks.

The address register 220 may receive the address ADDR including a bank address BANK_ADDR, a row address ROW_ADDR, and a column address COL_ADDR from the memory controller 100. The address register 220 may provide the received bank address BANK_ADDR to the bank control logic 230, may provide the received row address ROW_ADDR to the row address multiplexer 240, and may provide the received column address COL_ADDR to the column address latch 250.

The bank control logic 230 may generate bank control signals in response to the bank address BANK_ADDR. One of the first through eighth row decoders 260a~260h corresponding to the bank address BANK_ADDR may be activated in response to the bank control signals, and one of the first through eighth column decoders 270a~270h corresponding to the bank address BANK_ADDR may be activated in response to the bank control signals.

The row address multiplexer 240 may receive the row address ROW_ADDR from the address register 220, and may receive a refresh row address REF_ADDR from the refresh counter 245. The row address multiplexer 240 may selectively output the row address ROW_ADDR or the refresh row address REF_ADDR as a row address RA. The row address RA that is output from the row address multiplexer 240 may be applied to the first through eighth row decoders 260a~260h.

The activated one of the first through eighth row decoders 260a~260h may decode the row address RA that is output from the row address multiplexer 240, and may activate a word-line WL corresponding to the row address RA. For example, the activated row decoder may generate a word-line driving voltage and may apply the word-line driving voltage to the word-line WL corresponding to the row address RA.

The column address latch 250 may receive the column address COL_ADDR from the address register 220, and may temporarily store the received column address COL_ADDR. In example embodiments of the inventive concept, in a burst mode, the column address latch 250 may generate column addresses COL_ADDR' that increments from the received column address COL_ADDR. The column address latch 250 may apply the temporarily stored or generated column address COL_ADDR' to the first through eighth column decoders 270a~270h.

The activated one of the first through eighth column decoders 270a~270h may decode the column address COL_ADDR that is output from the column address latch 250, and may control the I/O gating circuit 290 to output data corresponding to the column address COL_ADDR.

The I/O gating circuit 290 may include circuitry for gating input/output data. The I/O gating circuit 290 may further include read data latches for storing data that is output from the first through eighth bank arrays 310a~310h, and write drivers for writing data to the first through eighth bank arrays 310a~310h.

Codeword read from one of the first through eighth bank arrays 310a~310h may be sensed by a sense amplifier coupled to the one bank array from which the data is to be read, and may be stored in the read data latches.

The codeword stored in the read data latches may be provided to the on-die ECC engine 320. The on-die ECC engine 320 may generate a data set by performing an ECC decoding on the codeword and may provide to the data set to the data I/O buffer 295. The data I/O buffer 295 may provide the data set DQ_BL1 to the memory controller 100.

Data set DQ_BL1 to be written in one of the first through eighth bank arrays 310a~310h may be provided to the data I/O buffer 295 from the memory controller 100. The data I/O buffer 295 may provide the data set to the on-die ECC engine 320. The on-die ECC engine 320 may generate parity bits based on the data set and may provide the I/O gating circuit 290 with a codeword including the data set and the parity bits. The I/O gating circuit 290 may store the codeword in a sub-page of one bank array.

The on-die ECC engine 320, in a write operation, may generate the parity bits by performing an ECC encoding on the data set DQ_BL1 from the data I/O buffer 295 and may store a codeword including the data set DQ_BL1 and the parity bits in a target page of the memory cell array 310.

In some implementations, the on-die ECC engine 320 may not be included in the data chip 200a.

In some implementations, the on-die ECC engine 320 may correct the symbol error and the multi-bit error in parallel, which is similar with the ECC engine 400 in the memory controller 100.

The control logic circuit 210 may control operations of the data chip 200a. For example, the control logic circuit 210 may generate control signals for the data chip 200a to perform the write operation or the read operation. The control logic circuit 210 may include a command decoder 211 that decodes the command CMD received from the memory controller 100 and a mode register 212 that sets an operation mode of the data chip 200a.

For example, the command decoder 211 may generate the control signals corresponding to the command CMD by decoding a write enable signal, a row address strobe signal, a column address strobe signal, a chip select signal, etc.

The control logic circuit 210 may generate a first control signal CTL1 to control the I/O gating circuit 290 and a second control signal CTL2 to control the on-die ECC engine 320 by decoding the command CMD.

The at least one parity chips 200s in FIG. 1 may have substantially the same configuration as the data chip 200a.

Figure 5:
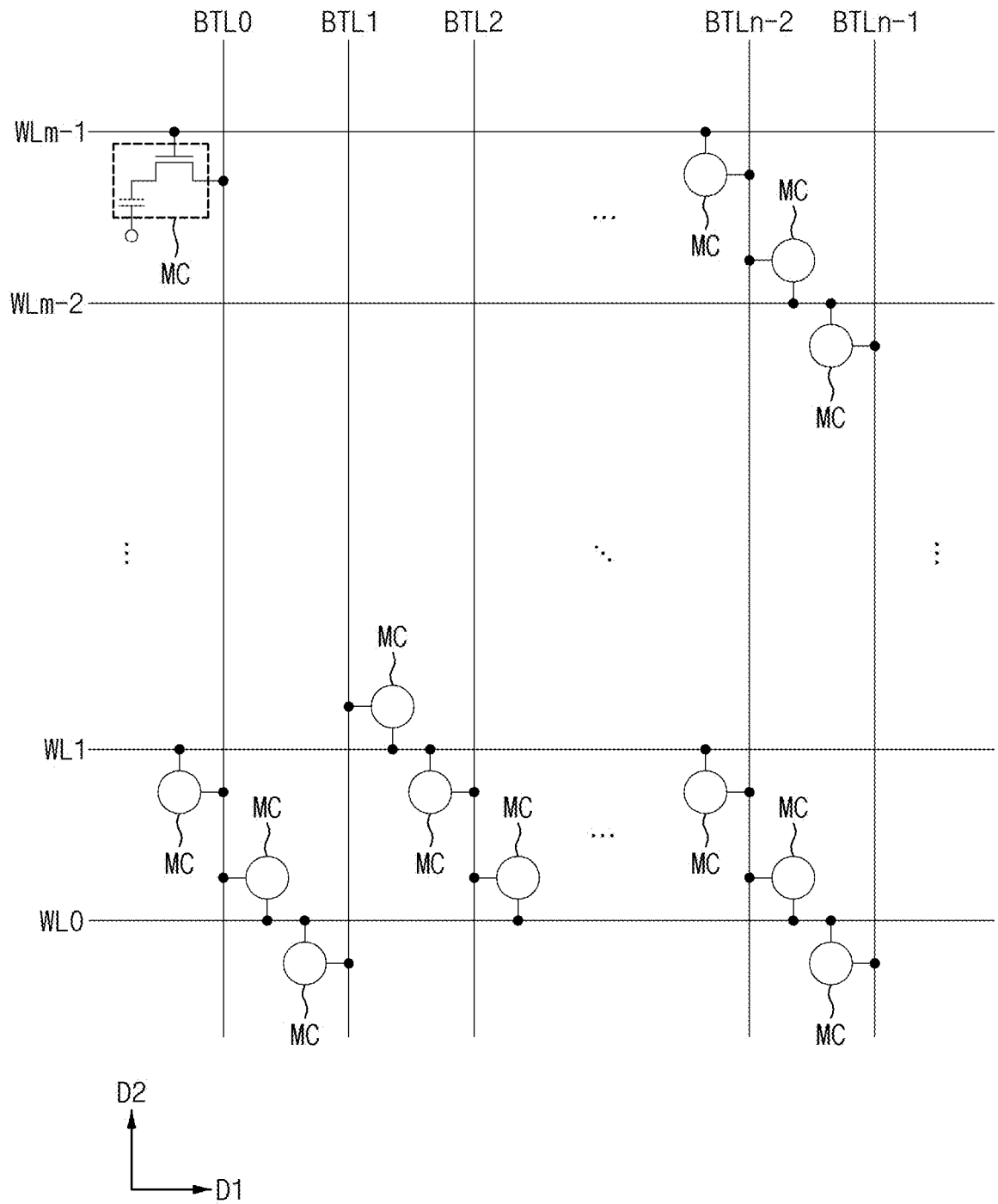
FIG. 5 illustrates an example of the first bank array in the data chip of FIG. 4 according to some implementations.

FIG. 5 illustrates an example of the first bank array in the data chip of FIG. 4 according to some implementations. In FIG. 5, the first bank array 310a may include a plurality of word-lines WL~WLm−1 (where m is an even number equal to or greater than two), a plurality of bit-lines BTL0~BTLn−1 (where n is an even number equal to or greater than two), and a plurality of memory cells MCs disposed at intersections between the word-lines WL0~WLm−1 and the bit-lines BTL0~BTLn−1. The word-lines WL~WLm−1 may extend in a first direction D1 and the w bit-lines BTL0~BTLn−1 may extend in a second direction D2.

Each of the memory cells MCs includes an access (cell) transistor coupled to one of the word-lines WL0~WLm−1 and one of the bit-lines BTL0~BTLn−1 and a storage (cell) capacitor coupled to the cell transistor. That is, each of the memory cells MCs has a DRAM cell structure.

In addition, the memory cells MCs may have different arrangement depending on that the memory cells MCs are coupled to an even word-line (for example, WL0) or an odd word-line (for example, WL1). That is, a bit-line coupled to adjacent memory cells may be different depending on whether a word-line selected by an access address is an even word-line or an odd word-line.

Figure 6:
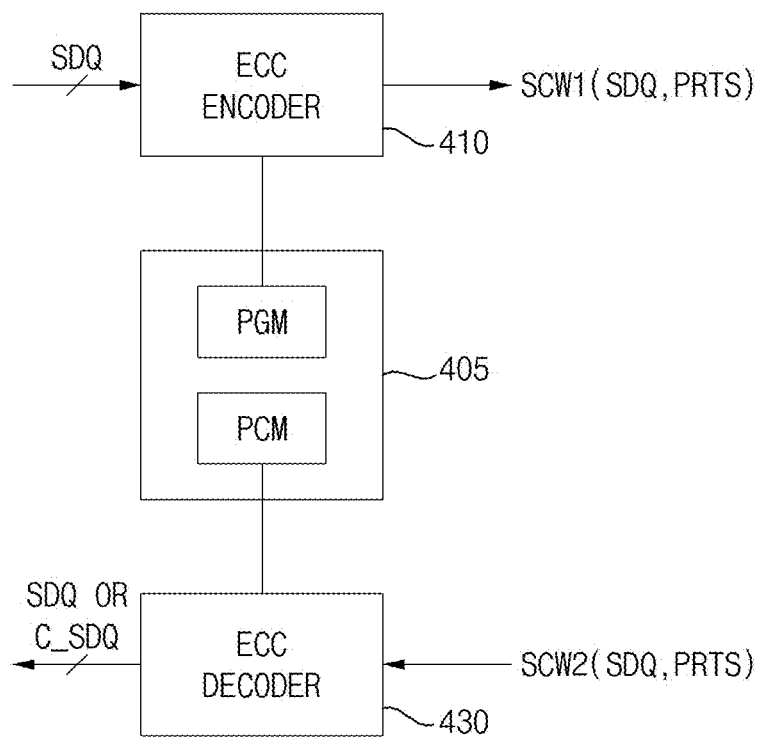
FIG. 6 is a block diagram illustrating an example of the system ECC engine in FIG. 2 according to some implementations.

FIG. 6 is a block diagram illustrating an example of the ECC engine in FIG. 2 according to some implementations. In FIG. 6, the ECC engine 400 may include an ECC encoder 410, an ECC decoder 430 and a memory 405. The memory 405 may be referred to as an ECC memory.

The memory 405 may be connected to the ECC encoder 410 and the ECC decoder 430 and may store a parity generation matrix PGM and a parity check matrix PCM.

The ECC encoder 410 may perform an ECC encoding on the user data set SDQ by using the parity generation matrix PGM to generate the parity data PRTS and may output the codeword set SCW1 including the user data set SDQ and the parity data PRTS.

The ECC decoder 430 may perform a first ECC decoding to correct the symbol error in the codeword set SCW2 by using a first sub check matrix and a second sub check matrix of the parity check matrix PCM, may perform a second ECC decoding to correct the multi-bit error and to detect the triple-bit error in the codeword set SCW2 by using the second sub check matrix and a third sub check matrix of the parity check matrix PCM, in parallel with performing the first ECC decoding and may output the corrected user data set C_SDQ. When the ECC decoder 430 cannot correct the symbol error and the multi-bit error, the ECC decoder 430 may output the user data set SDQ.

Figure 7:
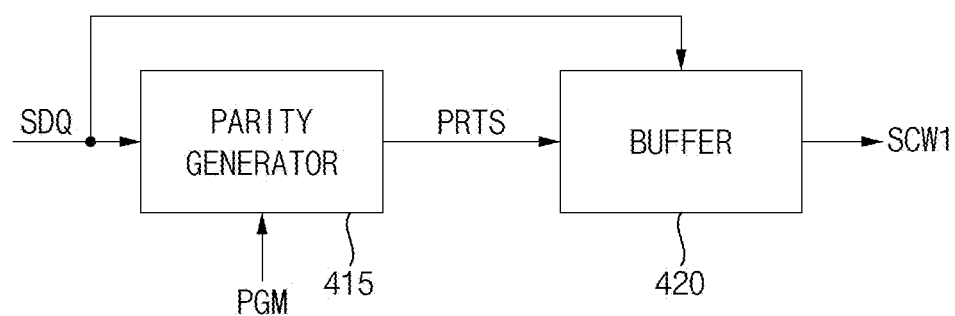
FIG. 7 illustrates an example of an ECC encoder in the ECC engine of FIG. 6 according to some implementations.

FIG. 7 illustrates an example of an ECC encoder in the ECC engine of FIG. 6 according to some implementations. In FIG. 7, the ECC encoder 410 may include a parity generator 415 and a buffer 420.

The parity generator 415 may perform an ECC encoding on the user data set SDQ by using the parity generation matrix PGM to generate the parity data PRTS and may provide the parity data PRTS to the buffer 420.

The buffer 420 may temporarily store the user data set SDQ and the parity data PRTS and may provide the memory module MM with the codeword set SCW1 including the user data set SDQ and the parity data PRTS.

Figure 8A:
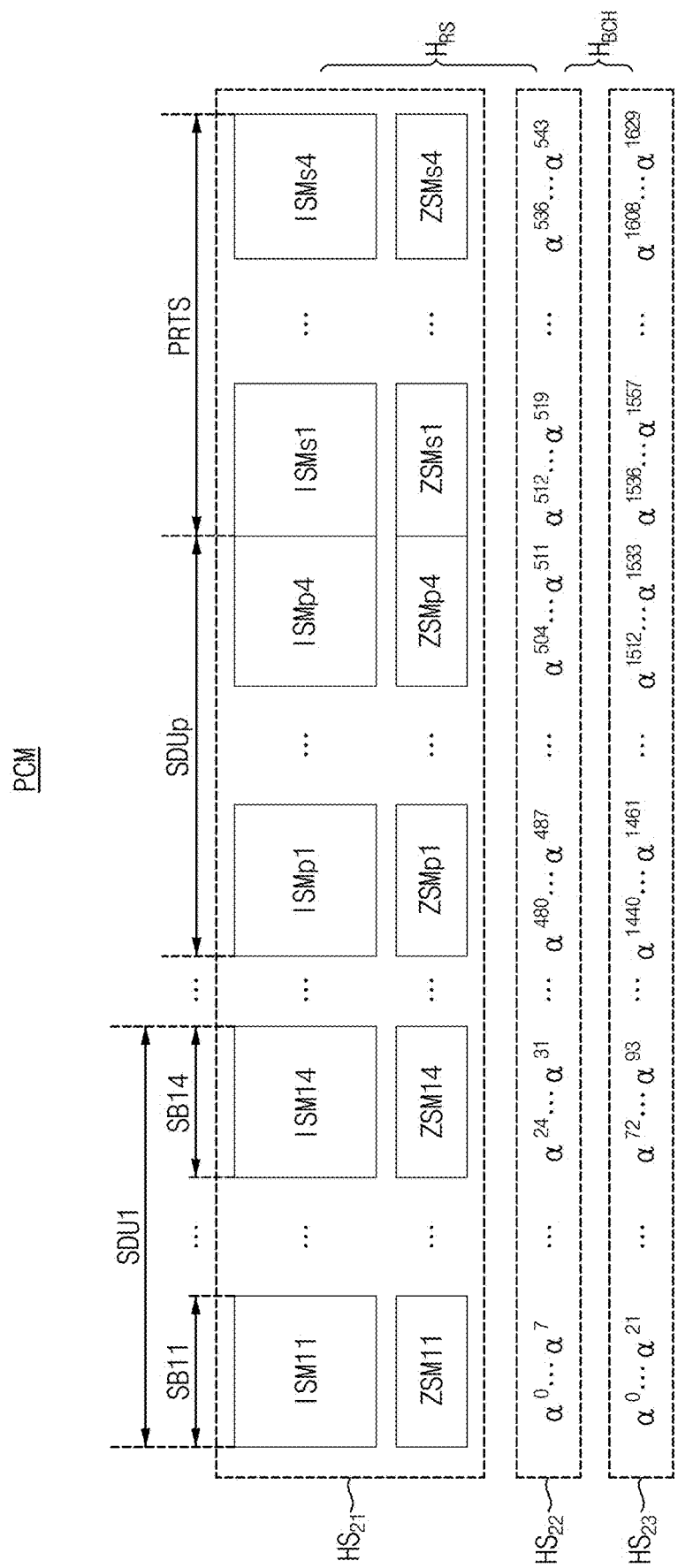
FIG. 8A illustrates an example of a parity check matrix stored in the memory in the ECC engine of FIG. 6 according to some implementations.

FIG. 8A illustrates an example of a parity check matrix stored in the memory in the ECC engine of FIG. 6 according to some implementations. Although FIG. 8A illustrates an example of the parity check matrix PCM, the parity generation matrix PGM may have a similar configuration with the parity check matrix PCM.

In FIG. 8A, the parity check matrix PCM may be generated based on a Reed-Solomon (RS) code and Bose-Chaudhuri-Hocquenghem (BCH) code, and may be used for generating the syndrome. The parity check matrix PCM may include a first sub check matrix $HS_{21}$, a second sub check matrix $HS_{22}$ and a third sub check matrix $HS_{23}$.

In FIG. 8A, a plurality of sub data units SDU1, ..., SDUp read from the plurality of memory chips 200a~200p and the parity data PRTS read from the parity chip 200a are illustrated for convenience of explanation and the sub data unit SDU1 may include a plurality of symbols SB11, SB12, SB13 and SB14. Each of the plurality of symbols SB11, SB12, SB13 and SB14 may include predetermined number of data bits. Each of the plurality of sub data units SDU1, ..., SDUp and the parity data PRTS may include a plurality of symbols corresponding to the symbols SB11, SB12, SB13 and SB14.

The first sub check matrix $HS_{21}$ may include a plurality of identity sub matrixes ISM11, ISM14, ..., ISMp1, ..., ISMp4, ISMs1, ..., ISMs4 and a plurality of zero sub matrixes ZSM11, ..., ZSM14, ..., ZSMp1, ..., ZSMp4, ZSMs1, ..., ZSMs4, the plurality of identity sub matrixes ISM11, ..., ISM14, ..., ISMp1, ..., ISMp4, ISMs1, ..., ISMs4 may correspond to a plurality of symbols in the read codeword set SCW and the plurality of zero sub matrixes ZSM11, ..., ZSM14, ..., ZSMp1, ..., ZSMp4, ZSMs1, ..., ZSMs4 may correspond to the plurality of identity sub matrixes ISM11, ..., ISM14, ..., ISMp1, ..., ISMp4, ISMs1, ..., ISMs4, respectively.

Each of the plurality of identity sub matrixes ISM11, ..., ISM14, ..., ISMp1, ..., ISMp4, ISMs1, ..., ISMs4 may have the same configuration and each of the plurality of zero sub matrixes ZSM11, ..., ZSM14, ..., ZSMp1, ..., ZSMp4, ZSMs1, ..., ZSMs4.

A number of rows in each of the plurality of zero sub matrixes ZSM11, ..., ZSM14, ..., ZSMp1, ..., ZSMp4, ZSMs1, ..., ZSMs4 may correspond to a half of a number of rows in each of the plurality of identity sub matrixes ISM11, ..., ISM14, ..., ISMp1, ..., ISMp4, ISMs1, ..., ISMs4.

The second sub check matrix $HS_{22}$ may include first alpha matrixes $\alpha^0 \ldots \alpha^7, \ldots, \alpha^{24} \ldots \alpha^{31}, \ldots, \alpha^{480} \ldots \alpha^{487} \ldots \alpha^{504} \ldots \alpha^{511}, \alpha^{512} \ldots \alpha^{519}, \ldots \alpha^{536} \ldots \alpha^{543}$ corresponding bits of the plurality of symbols and the first alpha matrixes $\alpha^0 \ldots \alpha^7, \ldots, \alpha^{24} \ldots \alpha^{31}, \ldots, \alpha^{480} \ldots \alpha^{487}, \ldots, \alpha^{504} \ldots \alpha^{511}, \alpha^{512} \ldots \alpha^{519}, \ldots \alpha^{536} \ldots \alpha^{543}$ may have exponential values that increase sequentially.

The third sub check matrix $HS_{23}$ may include second alpha matrixes $\alpha^0 \ldots \alpha^{21}, \ldots, \alpha^{72} \ldots \alpha^{93}, \ldots, \alpha^{140} \ldots \alpha^{1461}, \ldots, \alpha^{1512} \ldots \alpha^{1533}, \alpha^{1536} \ldots \alpha^{1557}, \ldots \alpha^{1608} \ldots \alpha^{1629}$ obtained by cubing each of the first alpha matrixes $\alpha^0 \ldots \alpha^7, \ldots, \alpha^{24} \ldots \alpha^{31}, \ldots, \alpha^{480} \ldots \alpha^{487}, \ldots, \alpha^{504} \ldots \alpha^{511}, \alpha^{512} \ldots \alpha^{519}, \ldots \alpha^{536} \ldots \alpha^{543}$.

The alpha matrix $\alpha^0$ may indicate an identity matrix and the alpha matrix $\alpha$ may be obtained using k-order primitive polynomial. $\alpha^2$ may be obtained by involution of $\alpha$. Elements of the $\alpha$ matrixes may belong to Galois field. Here, k may represent a number of elements of each of alpha matrixes.

The first sub check matrix $HS_{21}$ and the second sub check matrix $HS_{22}$ may implement an RS code $H_{RS}$ and second sub check matrix $HS_{22}$ and the third sub check matrix $HS_{23}$ may implement a BCH code $H_{BCH}$.

FIG. 8B illustrates an example of one of the plurality of identity sub matrixes and one of the plurality of zero sub matrixes in the first sub check matrix in FIG. 8A according to some implementations. In FIG. 8B, an identity sub matrix ISM11 includes h high level elements disposed in a diagonal direction and zero-value rest elements from among h×h elements. Here, h denotes number of bits in one symbol and h may be eight. In addition, a zero sub matrix ZSM11 includes h/2 (rows)×h (columns) elements and each of h/2×h elements has a zero value.

When a vector representation of the codeword set SCW1 stored in the memory module MM corresponds to CV, equation 1 is deduced.

$$CV = WDV \times G, \qquad \text{[equation 1]}$$

where WDV is a vector representation of the user data set SDQ and G is a vector representation of the parity generation matrix PGM.

When a vector representation of the codeword set SCW2 read from the memory module MM corresponds to R, R may include errors and R may be represented by equation 2.

$$R = WDV \times G + E, \qquad \text{[equation 2]}$$

where E corresponds to a vector representation of the errors.

The ECC decoder 430 may perform calculation on the read codeword set SCW2 with the parity check matrix PCM. When a vector representation of the parity check matrix PCM corresponds to H, a result of the calculation corresponds to equation 3.

$$R \times H^T = WDV \times G \times H^T + E \times H^T \qquad \text{[equation 3]}$$

The parity generation matrix G and the parity check matrix H are set for satisfying equation 4.

$$G \times H^T = 0 \quad \text{[equation 4]}$$

Therefore, equation 5 is deduced.

$$R \times H^T = E \times H^T \quad \text{[equation 4]}$$

A result of equation 5 may correspond to a vector representation S of the syndrome. The vector representation S of the syndrome may be obtained by multiplying vector representation of the errors and the transposition matrix $PCM^T$ of the parity check matrix PCM.

FIG. 9A illustrates an example of a vector representation of the read codeword set in FIG. 6 according to some implementations. In FIG. 9A, a vector representation R of the read codeword set SCW2 may include first through N-th read symbols $r_0, r_1, r_2, r_3, \ldots, r_{N-1}$. Here, N may denote a number of symbols in the read codeword set SCW2 and may be a natural number equal to or greater than four.

FIG. 9B illustrates an example of a vector representation of the syndrome according to some implementations. In FIG. 9B, a vector representation S of the syndrome may be represented by equation 6.

$$S = R \times H^T \quad \text{[equation 6]}$$

Here, S may correspond to $(S_0, S_1, S_2)^T$, $S_0$ may be a first sub syndrome, $S_1$ may be a second sub syndrome and S2 may be a third sub syndrome.

Figure 10:
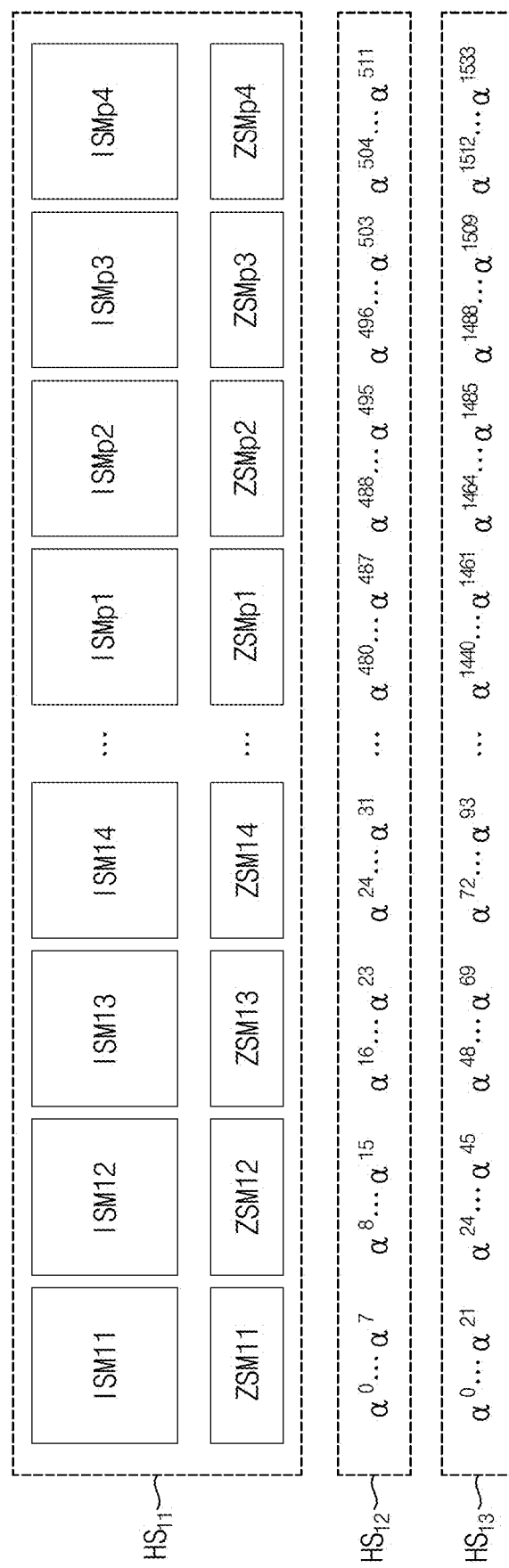
FIG. 10 illustrates an example of the parity generation matrix stored in the memory in the ECC engine of FIG. 6 according to some implementations.

FIG. 10 illustrates an example of the parity generation matrix stored in the memory in the ECC engine of FIG. 6 according to some implementations. In FIG. 10, the parity generation matrix PGM may include a first sub generation matrix $HS_{11}$, a second sub generation matrix $HS_{12}$ and a third sub generation matrix $HS_{13}$.

The first sub generation matrix $HS_{11}$ may include a plurality of identity sub matrixes ISM11, ISM12, ISM13, ISM14, ..., ISMp1, ISMp2, ISMp3, ISMp4 and a plurality of zero sub matrixes ZSM11, ZSM12, ZSM13, ZSM14, ..., ZSMp1, ZSMp2, ZSMp3, ZSMp4, the plurality of identity sub matrixes ISM11, ..., ISM14, ..., ISMp1, ..., ISMp4 may correspond to a plurality of symbols in the user data set SDQ to be stored in the memory chips 200a~200p and the plurality of zero sub matrixes ZSM11, ZSM12, ZSM13, ZSM14, ..., ZSMp1, ZSMp2, ZSMp3, ZSMp4 may correspond to the plurality of identity sub matrixes ISM11, ISM12, ISM13, ISM14, ..., ISMp1, ISMp2, ISMp3, ISMp4, respectively.

Each of the plurality of identity sub matrixes ISM11, ISM12, ISM13, ISM14, ..., ISMp1, ISMp2, ISMp3, ISMp4 may have the same configuration and each of the plurality of zero sub matrixes ZSM11, ZSM12, ZSM13, ZSM14, ..., ZSMp1, ZSMp2, ZSMp3, ZSMp4.

The second sub generation matrix $HS_{12}$ may include first alpha matrixes $\alpha^0 \ldots \alpha^7, \alpha^8 \ldots \alpha^{15}, \alpha^{16} \ldots \alpha^{23}, \alpha^{24} \ldots \alpha^{31}, \ldots, \alpha^{480} \ldots \alpha^{487}, \alpha^{488} \ldots \alpha^{495}, \alpha^{496} \ldots \alpha^{503}, \alpha^{504} \ldots \alpha^{511}$ corresponding bits of the plurality of symbols and the first alpha matrixes $\alpha^0 \ldots \alpha^7, \alpha^8 \ldots \alpha^{15}, \alpha^{16} \ldots \alpha^{23}, \alpha^{24} \ldots \alpha^{31}, \ldots, \alpha^{480} \ldots \alpha^{487}, \alpha^{488} \ldots \alpha^{495}, \alpha^{496} \ldots \alpha^{503}, \alpha^{504} \ldots \alpha^{511}$ may have exponential values that increase sequentially.

The third sub generation matrix $HS_{13}$ may include second alpha matrixes $\alpha^0 \ldots \alpha^{21}, \alpha^{24} \ldots \alpha^{45}, \alpha^{48} \ldots \alpha^{69}, \alpha^{72} \ldots \alpha^{93}, \ldots, \alpha^{1440} \ldots \alpha^{1461}, \alpha^{1464} \ldots \alpha^{1485}, \alpha^{1488} \ldots \alpha^{1509}, \alpha^{1512} \ldots \alpha^{1533}$ obtained by cubing each of the first alpha matrixes $\alpha^0 \ldots \alpha^7, \alpha^8 \ldots \alpha^{15}, \alpha^{16} \ldots \alpha^{23}, \alpha^{24} \ldots \alpha^{31}, \ldots, \alpha^{480} \ldots \alpha^{487}, \alpha^{488} \ldots \alpha^{495}, \alpha^{496} \ldots \alpha^{503}, \alpha^{504} \ldots \alpha^{511}$.

The parity generation matrix PGM may be generated by a generation polynomial of equation 7.

$$g(x) = (x^8 + 1)p(x)p_3(x) \quad \text{[equation 7]}$$

In equation 7, p(x) denotes a primitive polynomial and $p_3(x)$ denotes a minimum polynomial elements of conjugacy class with respect to $\alpha^3$. In addition, the alpha matrixes may be primitive elements of Galois field $GF^{12}$.

In equation 7, $(x^8+1)$ may correspond the first sub generation matrix $HS_{11}$ (in FIG. 10) and the first sub check matrix $HS_{21}$ (in FIG. 8A), p(x) may correspond the second sub generation matrix $HS_{12}$ (in FIG. 10) and the second sub check matrix $HS_{22}$ (in FIG. 8A), and $p_3(x)$ may correspond the third sub generation matrix $HS_{13}$ (in FIG. 10) and the third sub check matrix $HS_{23}$ (in FIG. 8A).

Accordingly, the ECC decoder 430 may correct the symbol error in the read codeword set SCW2 by using $(x^8+1)$ p(x) and may correct random multi-bit error in the read codeword set SCW2 by using $p(x)p_3(x)$.

Figure 11:
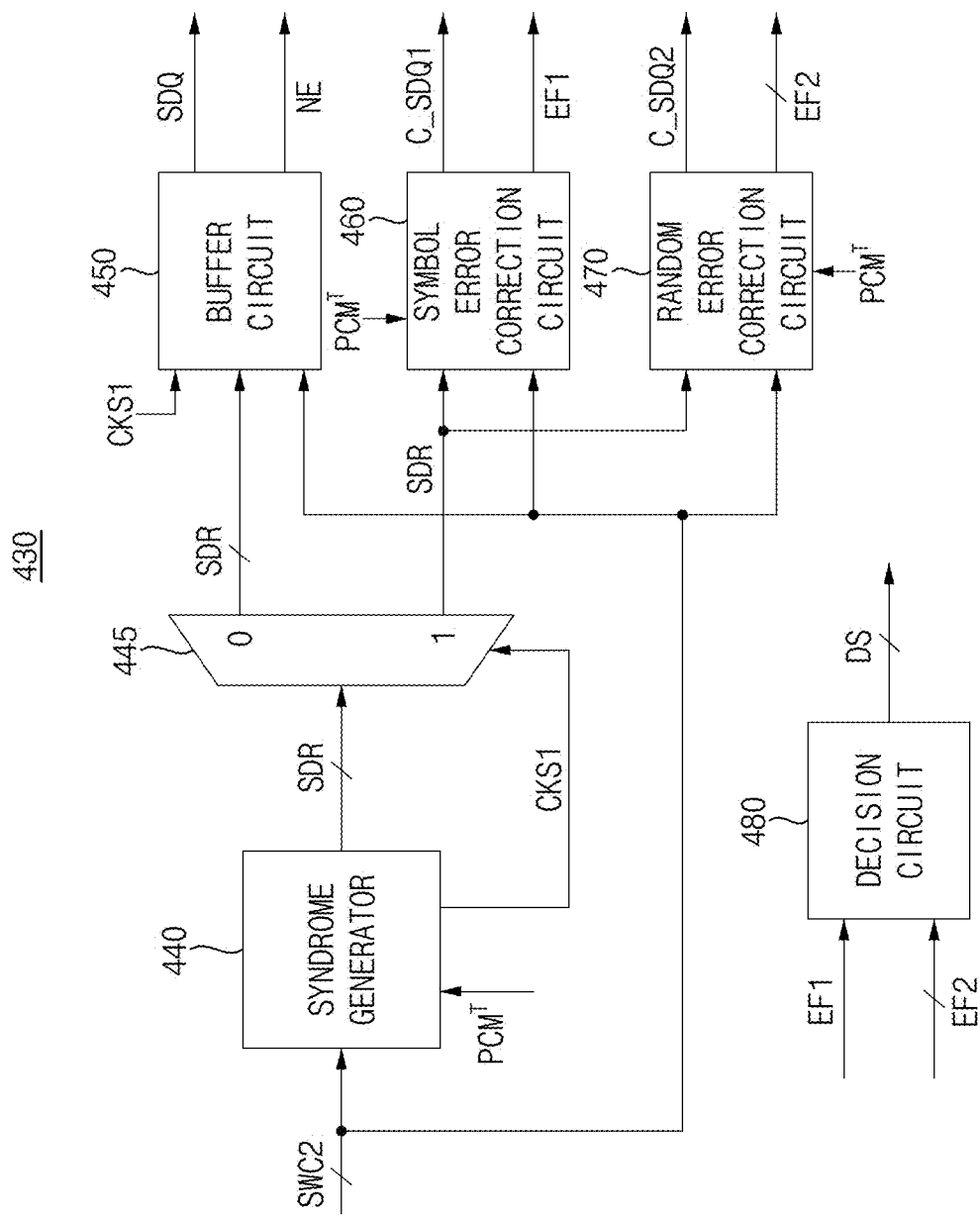
FIG. 11 is a block diagram illustrating an example of the ECC decoder in the ECC engine of FIG. 6 according to some implementations.

FIG. 11 is a block diagram illustrating an example of the ECC decoder in the ECC engine of FIG. 6 according to some implementations. In FIG. 11, the ECC decoder 430 may include a syndrome generator 440, a demultiplexer 445, a buffer circuit 450, a symbol error correction circuit 460, a random error correction circuit 470 and a decision circuit 480.

The syndrome generator 440 may generate a syndrome SDR by performing a matrix-multiplication operation on the read codeword set SCW2 and a transposition matrix $PCM^T$ of the parity check matrix PCM, may generate a check signal CKS1 indicating whether each of syndrome values of the syndrome SDR is zero and may provide the syndrome SDR and the check signal CKS1 to the demultiplexer 445.

The syndrome generator 440 may generate the first sub syndrome $S_0$ based on the read codeword set SCW2 and the first sub check matrix $HS_{21}$, may generate the second sub syndrome $S_1$ based on the read codeword set SCW2 and the second sub check matrix $HS_{22}$ and may generate the third sub syndrome $S_2$ based on the read codeword set SCW2 and the third sub check matrix $HS_{23}$. Each of the first sub syndrome $S_0$, the second sub syndrome $S_1$ and the third sub syndrome $S_2$ may be represented by a vector having one row and twelve columns.

The demultiplexer 445 may provide the syndrome SDR to the buffer circuit 450 in response to the check signal CKS1 having a logic low level, and may provide the syndrome SDR to the symbol error correction circuit 460 and the random error correction circuit 470 in response to the check signal CKS1 having a logic high level. The check signal CKS1 having a logic low level may indicate that each of syndrome values of the syndrome SDR is zero. The check signal CKS1 having a logic high level may indicate that at least one of the syndrome values of the syndrome SDR is non-zero.

The buffer circuit 450, the symbol error correction circuit 460 and the random error correction circuit 470 may receive the read codeword set SCW2.

The buffer circuit 450, in response to check signal CKS1 having a logic low level, may output the user data set SDQ in the read codeword set SCW2 without correcting the user data set SDQ and may output a non-error signal NE indicating that the read codeword set SCW2 does not include errors.

The symbol error correction circuit 460 may receive the syndrome SDR, the read codeword set SCW2 and the transposition matrix $PCM^T$, may perform a first ECC decoding on the read codeword set SCW2 by using the first sub check matrix and the second sub check matrix of the parity check matrix PCM, in response to at least one of the syndrome values of the syndrome SDR having a non-zero value, and may generate a first error flag EF1 indicating whether the symbol error is corrected.

The random error correction circuit 470 may receive the syndrome SDR, the read codeword set SCW2 and the transposition matrix $PCM^T$, may perform a second ECC decoding on the read codeword set by using the second sub check matrix and the third sub check matrix of the parity check matrix, in response to at least one of the syndrome values of the syndrome SDR having a non-zero value, may output the corrected user data set C_SDQ2 and may generate a second error flag EF2 indicating at least one of whether the multi-bit error is corrected, whether the triple-bit error is detected and whether the single bit error is detected. The random error correction circuit 470 may perform the second ECC decoding in parallel with the symbol error correction circuit 460 performing the first ECCC decoding.

The decision circuit 480 may receive the first error flag EF1 and the second error flag EF2, may generate a decision signal DS indicating a result of the first ECC decoding and a result of the second ECC decoding based on logic levels of the first error flag EF1 and the second error flag EF2 and may provide the decision signal DS to the processor 110 in FIG. 2.

When the symbol error and the random multi-bit error are included in the read codeword set SCW2, the ECC decoder 430 may reduce decoding latency corresponding to a time interval required for correcting symbol error and the random multi-bit error by performing the first ECC decoding and the second ECC decoding that share the second sub check matrix, in parallel.

Figure 12:
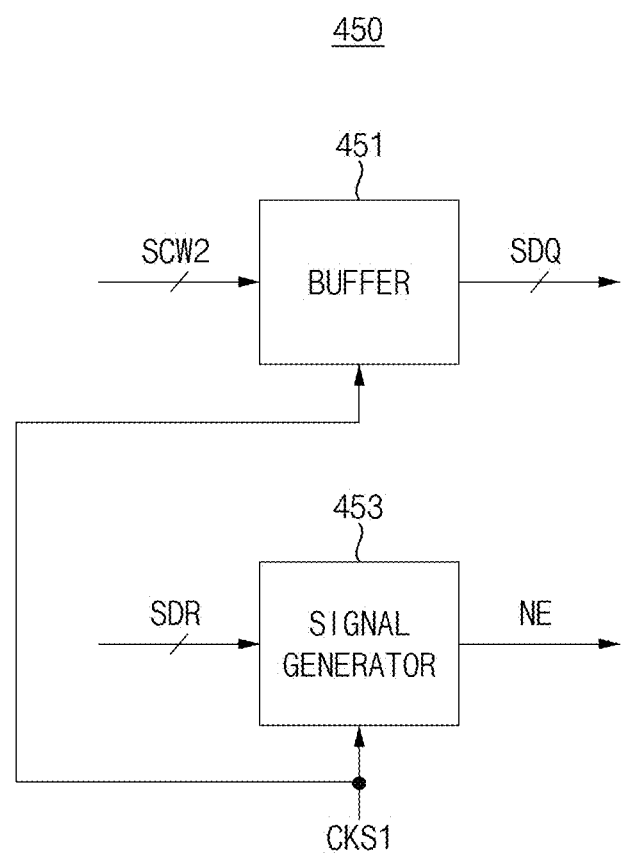
FIG. 12 is a block diagram illustrating an example of the buffer circuit in the ECC decoder of FIG. 11 according to some implementations.

FIG. 12 is a block diagram illustrating an example of the buffer circuit in the ECC decoder of FIG. 11 according to some implementations. In FIG. 12, the buffer circuit 450 may include a buffer 451 and a signal generator 453.

The buffer 451 may store the read codeword set SCW2 temporarily and may output the user data set SDQ in the read codeword set SCW2, in response to the check signal CKS1 having a logic low level.

The signal generator 453 may receive the syndrome SDR and the check signal CKS1, may generate the non-error signal NE indicating that the read codeword set SCW2 does not include errors, in response to the check signal CKS1 having a logic low level and may output the non-error signal NE.

Figure 13:
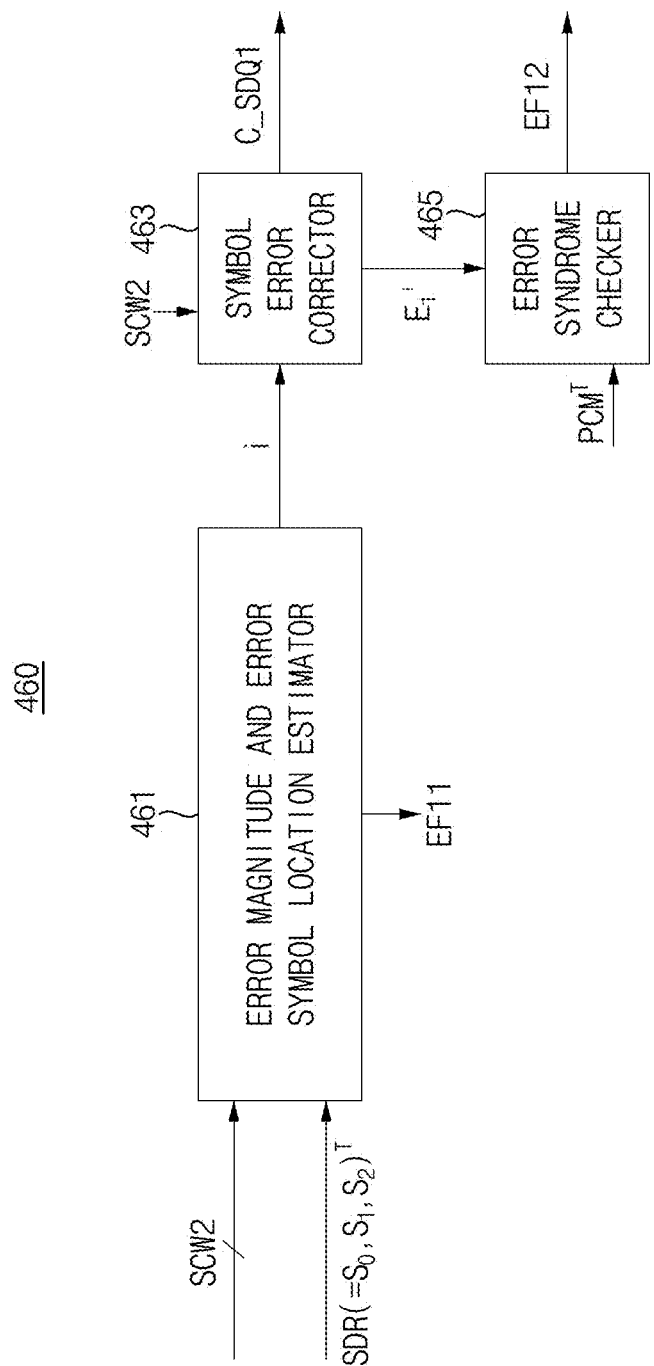
FIG. 13 is a block diagram illustrating an example of the symbol error correction circuit in the ECC decoder of FIG. 11 according to some implementations.

FIG. 13 is a block diagram illustrating an example of the symbol error correction circuit in the ECC decoder of FIG. 11 according to some implementations. In FIG. 13, the symbol error correction circuit 460 may include an error magnitude and symbol location estimator 461, a symbol error correct and an error syndrome checker 465.

The error magnitude and symbol location estimator 461 may receive the read codeword set SCW2 and the syndrome SDR including the first sub syndrome $S_0$, the second sub syndrome $S_1$ and the third sub syndrome $S_2$, may estimate a magnitude of the symbol error and a location of a target symbol in which the symbol error occurs based on a ratio of the second sub syndrome $S_1$ to the first sub syndrome $S_0$ and may provide the symbol error corrector 463 with location information i of the target symbol.

The error magnitude and symbol location estimator 461 may output a first error flag EF11 indicating that the first ECC decoding has failed, in response to a target alpha matrix non-existing in the first alpha matrixes $\alpha^0 \ldots \alpha^7, \ldots, \alpha^{24} \ldots \alpha^{31}, \ldots, \alpha^{480} \ldots \alpha^{487}, \ldots, \alpha^{504} \ldots \alpha^{511}, \alpha^{512} \ldots \alpha^{519}, \ldots, \alpha^{536} \ldots \alpha^{543}$. The target alpha matrix matches the ratio of the second sub syndrome $S_1$ to the first sub syndrome $S_0$.

The symbol error corrector 463 may generate a corrected user data set C_SDQ1 by correcting an error of the target symbol among the plurality of symbols of the read codeword set SCW2 based on location information i of the target symbol, and may estimate a first error vector based on the location information i of the target symbol and the first sub syndrome $S_0$ and may output an estimated first error vector $E_1'$ to the error syndrome checker 465. That is symbol error corrector 463 may output the estimated first error vector $E_1'$ to the error syndrome checker 465 based on the location information i of the target symbol and the first sub syndrome $S_0$.

In response to a target alpha matrix that matches the ratio of the second sub syndrome $S_1$ to the first sub syndrome $S_0$ existing in the first alpha matrixes $\alpha^0 \ldots \alpha^7, \ldots, \alpha^{24} \ldots \alpha^{31}, \ldots, \alpha^{480} \ldots \alpha^{487}, \ldots, \alpha^{504} \ldots \alpha^{511}, \alpha^{512} \ldots \alpha^{519}, \ldots \alpha^{536} \ldots \alpha^{543}$, the error magnitude and symbol location estimator 461 may estimate a symbol corresponding to a value obtained by dividing an exponential of the target symbol by a number of bits in each of the plurality of symbols as the target symbol.

The symbol error corrector 463 may output the estimated first error vector $E_1'$ by replacing the target symbol with a portion of the first sub syndrome $S_0$ and setting each bit of the plurality of symbols except the target symbol to zero.

The error syndrome checker 465 may perform a first vector-multiplication operation on the estimated first error vector $E_1'$ and the transposition matrix $PCM^T$, and may generate a first error flag EF12 based on a result of the first vector-multiplication operation.

The error syndrome checker 465 may output the first error flag EF12 indicating that the first ECC decoding has succeeded, in response to the result of the first vector-multiplication operation matching the syndrome SDR.

The error syndrome checker 465 may output the first error flag EF12 indicating that the first ECC decoding has failed, in response to the result of the first vector-multiplication operation being different from the syndrome SDR.

Figure 14:
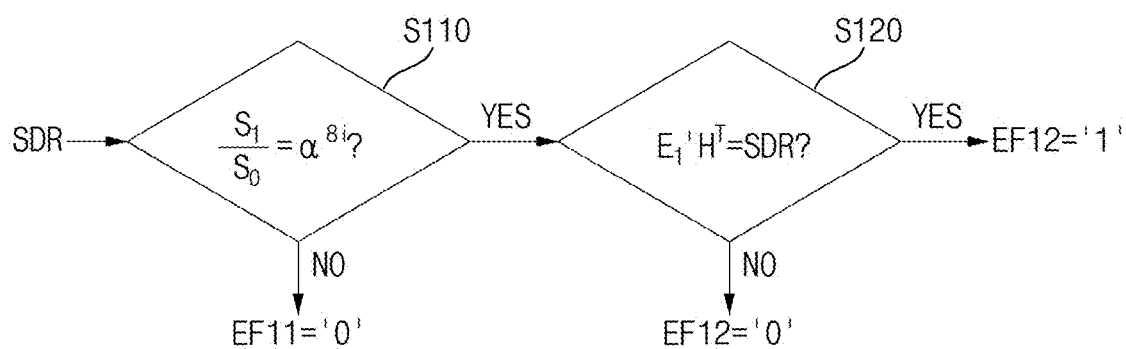
FIG. 14 illustrates an example operation of the symbol error correction circuit of FIG. 13 according to some implementations.

FIG. 14 illustrates an example operation of the symbol error correction circuit of FIG. 13 according to some implementations. In FIGS. 13 and 14, the error magnitude and symbol location estimator 461 may determine whether a target alpha matrix $\alpha^{8i}$ matching the ratio of the second sub syndrome to the first sub syndrome exists in the first alpha matrixes $\alpha^0 \ldots \alpha^7, \ldots, \alpha^{24} \ldots \alpha^{31}, \ldots, \alpha^{480} \ldots \alpha^{487}, \ldots, \alpha^{504} \ldots \alpha^{511}, \alpha^{512} \ldots \alpha^{519}, \ldots \alpha^{536} \ldots \alpha^{543}$ (operation S110) and may output the first error flag EF11 indicating that the first ECC decoding has failed, in response to the target alpha matrix $\alpha^{8i}$ matching the ratio of the second sub syndrome $S_1$ to the first sub syndrome $S_0$ non-exists in the first alpha matrixes $\alpha^0 \ldots \alpha^7, \ldots,$ $\alpha^{24} \ldots \alpha^{31}, \ldots, \alpha^{480} \ldots \alpha^{487}, \ldots, \alpha^{504} \ldots \alpha^{511},$ $\alpha^{512} \ldots \alpha^{519}, \ldots \alpha^{536} \ldots \alpha^{543}$ (NO in S110).

When the target alpha matrix $\alpha^{8i}$ matching the ratio of the second sub syndrome $S_1$ to the first sub syndrome $S_0$ exists in the first alpha matrixes $\alpha^0 \ldots \alpha^7, \ldots, \alpha^{24} \ldots$ $\alpha^{31}, \ldots, \alpha^{480} \ldots \alpha^{487}, \ldots, \alpha^{504} \ldots \alpha^{511}, \alpha^{512} \ldots$ $\alpha^{519}, \ldots \alpha^{536} \ldots \alpha^{543}$ (YES in S110), the error magnitude and symbol location estimator 461 may provide the location information i of the target symbol to the symbol error corrector 463 and the symbol error corrector 463 may output the estimated first error vector $E_1'$ to the error syndrome checker 465. The error syndrome checker 465 may perform a first vector-multiplication operation on the estimated first error vector $E_1'$ and the transposition matrix $PCM^T$, and may determine whether a result of the first vector-multiplication operation matches the syndrome SDR (operation S120).

When the result of the first vector-multiplication operation matches the syndrome SDR (YES in S120), the error syndrome checker 465 may output the first error flag EF12 indicating the first ECC decoding has succeeded with a logic high level. When the result of the first vector-multiplication operation is different from the syndrome SDR (NO in S120), the error syndrome checker 465 may output the first error flag EF12 indicating the first ECC decoding has failed with a logic low level. The first error flags EF11 and EF12 may be included in the first error flag EF1 in FIG. 11.

Accordingly, the ECC decoder 430 may estimate a first error vector associated with the symbol error based on comparing the second sub syndrome $S_1$ and the first sub syndrome $S_0$, and may generate the first error flag EF1 indicating a result of the first ECC decoding by performing the first vector-multiplication operation on the estimated first error vector $E_1'$ and the transposition matrix $PCM^T$.

Figure 15:
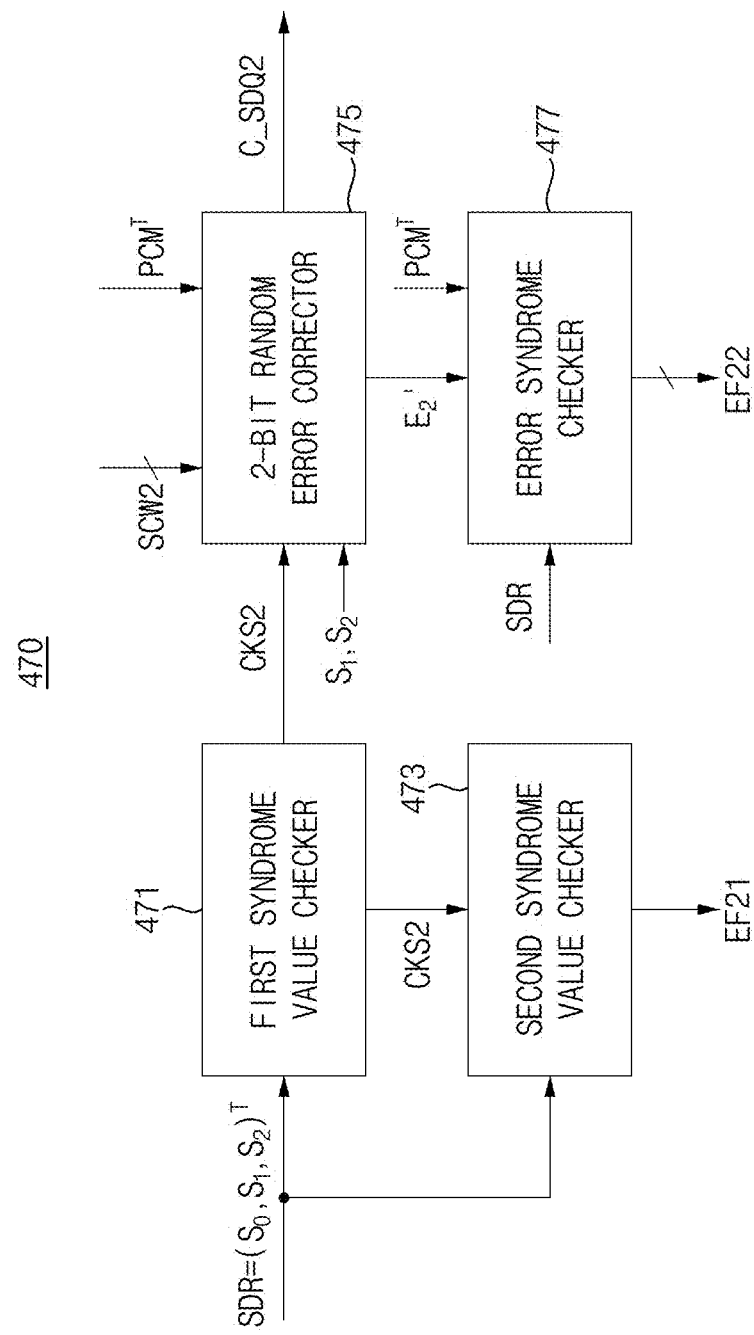
FIG. 15 is a block diagram illustrating an example of the random error correction circuit in the ECC decoder of FIG. 11 according to some implementations.

FIG. 15 is a block diagram illustrating an example of the random error correction circuit in the ECC decoder of FIG. 11 according to some implementations. In FIG. 15, the random error correction circuit 470 may include a first syndrome value checker 471, a second syndrome value checker 473, a multi-bit (2-bit) error corrector 475 and an error syndrome checker 477. The first syndrome value checker 471 may receive the syndrome SDR including the first sub syndrome $S_0$, the second sub syndrome $S_1$ and the third sub syndrome $S_2$, may determine whether a first summed value of syndrome values of the first sub syndrome $S_0$ is zero or two, may generate a check signal CKS2 indicating a result of the determination and may provide the check signal CKS2 to the second syndrome value checker 473 and the multi-bit error corrector 475.

The second syndrome value checker 473 may receive the syndrome SDR including the first sub syndrome $S_0$, the second sub syndrome $S_1$ and the third sub syndrome $S_2$, may determine whether the first summed value is one, in response the first summed value not being zero and two, may output a second error flag EF21 indicating that the triple-bit error is detected, in response to the first summed value not being one, and may output the second error flag EF21 indicating one of whether the triple-bit error is detected and whether the single bit error is detected based on the second sub syndrome $S_1$ and the third sub syndrome $S_2$, in response to the first summed value being one.

In response to a result of cubing the second sub syndrome $S_1$ matching the third sub syndrome $S_2$, the second syndrome value checker 473 may output the second error flag EF21 indicating that the single bit error is detected. In response to a result of cubing the second sub syndrome $S_1$ being different from the third sub syndrome $S_2$, the second syndrome value checker 473 may output the second error flag EF21 indicating that the triple-bit error is detected is detected.

The multi-bit error corrector 475 may receive the read codeword set SCW2, the transposition matrix $PCM^T$, the second sub syndrome $S_1$ and the third sub syndrome $S_2$, may estimate a location of the multi-bit error based on the second sub s syndrome $S_1$ and the third sub syndrome $S_2$, in response to the check signal CKS2 indicting that the first summed value is zero or two, may generate a corrected user data set C_SDQ2 by correcting the multi-bit error in the read codeword set SCW2 based on the estimated location, may estimate a second error vector $E_2'$ based on the estimated location and may output the estimated second error vector $E_2'$.

The multi-bit error corrector 475 may output the estimated second error vector $E_2'$ by setting first bits of locations corresponding to the multi-bit error in the read codeword set SCW2 to logic high levels and by setting second bits except the first bits in the read codeword set SCW2 to logic low levels.

The error syndrome checker 477 may perform a second vector-multiplication operation on the estimated second error vector $E_2'$ and the transposition matrix $PCM^T$, and may generate a second error flag EF22 based on a result of the second vector-multiplication operation.

The error syndrome checker 477 may output the second error flag EF22 indicating that the double-bit error was corrected, in response to the result of the second vector-multiplication operation matching the syndrome SDR.

The error syndrome checker 477 may output the second error flag EF22 indicating that the triple-bit error was detected, in response to the result of the second vector-multiplication operation being different from the syndrome SDR.

Figure 16:
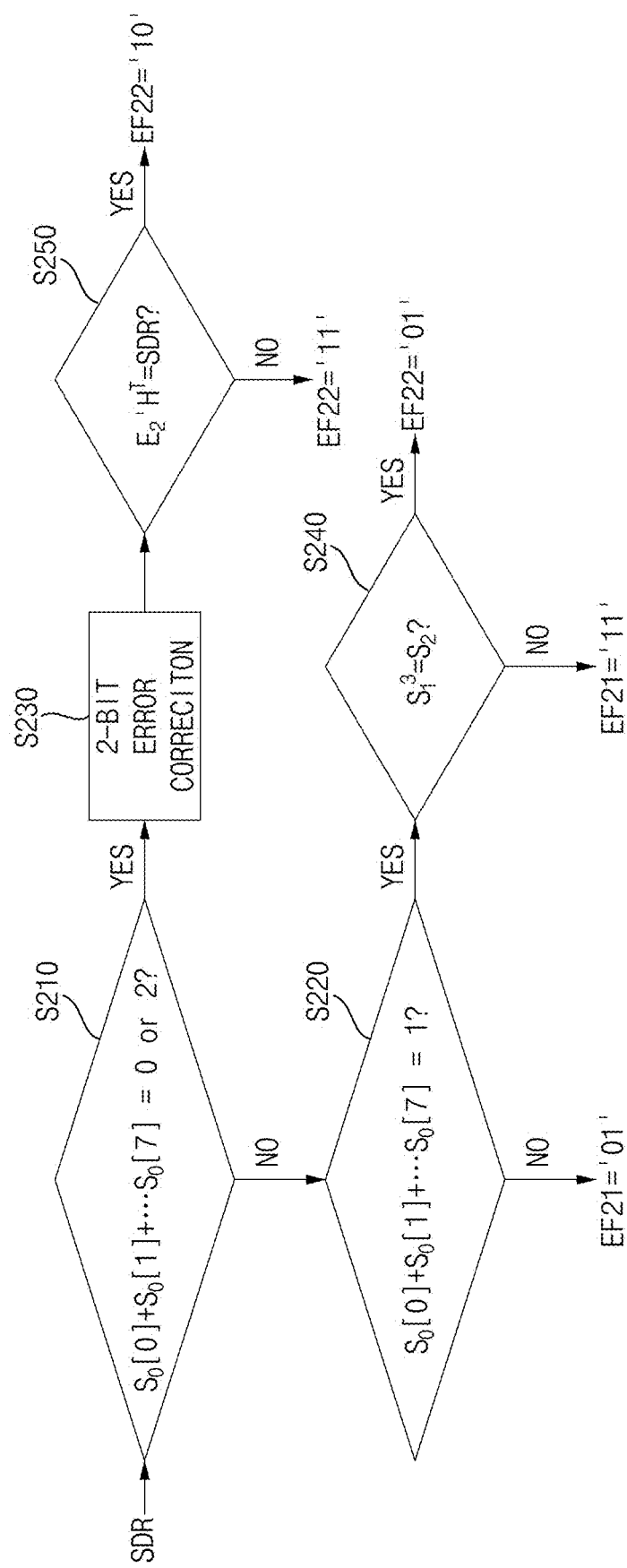
FIG. 16 illustrates an example operation of the random error correction circuit of FIG. 15 according to some implementations.

FIG. 16 illustrates an example operation of the random error correction circuit of FIG. 15 according to some implementations. In FIGS. 15 and 16, the first syndrome value checker 471 may determine whether a first summed value $S_0[0]+S_0[1]+S_0[2]+S_0[3]+S_0[4]+S_0[5]+S_0[6]+S_0[7]$ of syndrome values of the first sub syndrome $S_0$ is zero or two (operation S210). The first sub syndrome $S_0$ may be obtained by performing a vector-multiplication on the read codeword set SCW2 and the first sub check matrix $HS_{21}$, and the first sub check matrix $HS_{21}$ includes the plurality of identity sub matrixes ISM11, . . . , ISM14, . . . , ISMp1, . . . , ISMp4, ISMs1, . . . , ISMs4 and the plurality of zero sub matrixes ZSM11, . . . , ZSM14, . . . , ZSMp1, . . . , ZSMp4, ZSMs1, . . . , ZSMs4 corresponding to the plurality of identity sub matrixes ISM11, . . . , ISM14, . . . , ISMp1, . . . , ISMp4, ISMs1, . . . , ISMs4, respectively. Therefore, syndrome values $S_0[8], S_0[9], S_0[10]$ and $S_0[11]$ of the first sub syndrome $S_0$ are all zeros, because the syndrome values $S_0[8], S_0[9], S_0[10]$ and $S_0[11]$ correspond to a result of the vector-multiplication on the read codeword set SCW2 and the plurality of zero sub matrixes ZSM11, . . . , ZSM14, . . . , ZSMp1, . . . , ZSMp4, ZSMs1, . . . , ZSMs4.

When the first summed value $S_0[0]+S_0[1]+S_0[2]+S_0[3]+S_0[4]+S_0[5]+S_0[6]+S_0[7]$ is not zero and two (NO in operation S210), the second syndrome value checker 473 may whether the first summed value $S_0[0]+S_0[1]+S_0[2]+S_0[3]+S_0[4]+S_0[5]+S_0[6]+S_0[7]$ is one (operation S220).

When the first summed value $S_0[0]+S_0[1]+S_0[2]+S_0[3]+S_0[4]+S_0[5]+S_0[6]+S_0[7]$ is not one (NO in operation S220), the second syndrome value checker 473 may output the second error flag EF21 indicating that the triple-bit error is detected as '01'.

When the first summed value $S_0[0]+S_0[1]+S_0[2]+S_0[3]+S_0[4]+S_0[5]+S_0[6]+S_0[7]$ is one (YES in operation S220), the second syndrome value checker 473 may determine whether a result of cubing the second sub syndrome $S_1$ matches the third sub syndrome $S_2$ (operation S240).

When the result of cubing the second sub syndrome $S_1$ is different from the third sub syndrome $S_2$ (NO in operation S240), the second syndrome value checker 473 may output the second error flag EF21 indicating that the triple-bit error is detected as '11'. When the result of cubing the second sub syndrome $S_1$ matches the third sub syndrome $S_2$ (YES in operation S240), the second syndrome value checker 473 may output the second error flag EF21 indicating that the single-bit error is detected as '01'.

When the first summed value $S_0[0]+S_0[1]+S_0[2]+S_0[3]+S_0[4]+S_0[5]+S_0[6]+S_0[7]$ is zero or two (YES in operation S210), The multi-bit error corrector 475 may correct the multi-bit error in the read codeword set SCW2 (operation S230) and may output the estimated second error vector $E_2'$ to the error syndrome checker 477.

The error syndrome checker 477 may perform a second vector-multiplication operation on the estimated second error vector $E_2'$ and the transposition matrix $PCM^T$ and may determine whether a result of the second vector-multiplication operation matches the syndrome SDR (operation S250).

When the result of the second vector-multiplication operation is different from the syndrome SDR (NO in operation S250), the error syndrome checker 477 may output the second error flag EF22 indicating that the triple-bit error is detected as '11'. When the result of the second vector-multiplication operation matches the syndrome SDR (YES in operation S250), the error syndrome checker 477 may output the second error flag EF22 indicating that the multi-bit error is corrected as '10'.

The second error flags EF21 and EF22 may be included in the second error flag EF2 in FIG. 11.

Accordingly, the ECC decoder 430 may estimate a second error vector associated with the multi-bit error based on the first summed value $S_0[0]+S_0[1]+S_0[2]+S_0[3]+S_0[4]+S_0[5]+S_0[6]+S_0[7]$, and may generate the second error flag EF2 associated with correcting the multi-bit error. In addition, the ECC decoder 430 may generate the second error flag EF2 indicating whether the single-bit error is detected or whether the triple-bit error is detected based the first summed value $S_0[0]+S_0[1]+S_0[2]+S_0[3]+S_0[4]+S_0[5]+S_0[6]+S_0[7]$, the second sub syndrome $S_1$ and the third sub syndrome $S_2$.

Operations on the first sub syndrome S0, the second sub syndrome S1 and the third sub syndrome S2 may be performed within Galois field, in the description with reference to FIGS. 11 through 16.

FIG. 17 is a table illustrating that an example of a decision circuit configured to determine an error based on the decision signal according to some implementations. In FIGS. 11 through 17, the decision signal DS may include the first error flag EF1 and the second error flag EF2.

The first error flag EF1 may include one bit and the second error flag EF2 may include two (i.e., double) bits. When the first error flag EF1 has a logic low level (i.e., '0') and the second error flag EF2 is '01' the decision circuit 480 may output the decision signal DS indicating that uncorrectable errors UE are detected in the read codeword set SCW2. When the first error flag EF1 has a logic low level (i.e., '0') and the second error flag EF2 is '10' the decision circuit 480 may output the decision signal DS indicating that the double bit error is corrected in the read codeword set SCW2. When the first error flag EF1 has a logic low level (i.e., '0') and the second error flag EF2 is '11' the decision circuit 480 may output the decision signal DS indicating that the triple-bit error is detected in the read codeword set SCW2. When the first error flag EF1 has a logic high level (i.e., '1') and the second error flag EF2 is one of '01', '10' and '11' the decision circuit 480 may output the decision signal DS indicating that the symbol error is corrected in the read codeword set SCW2.

Figure 18:
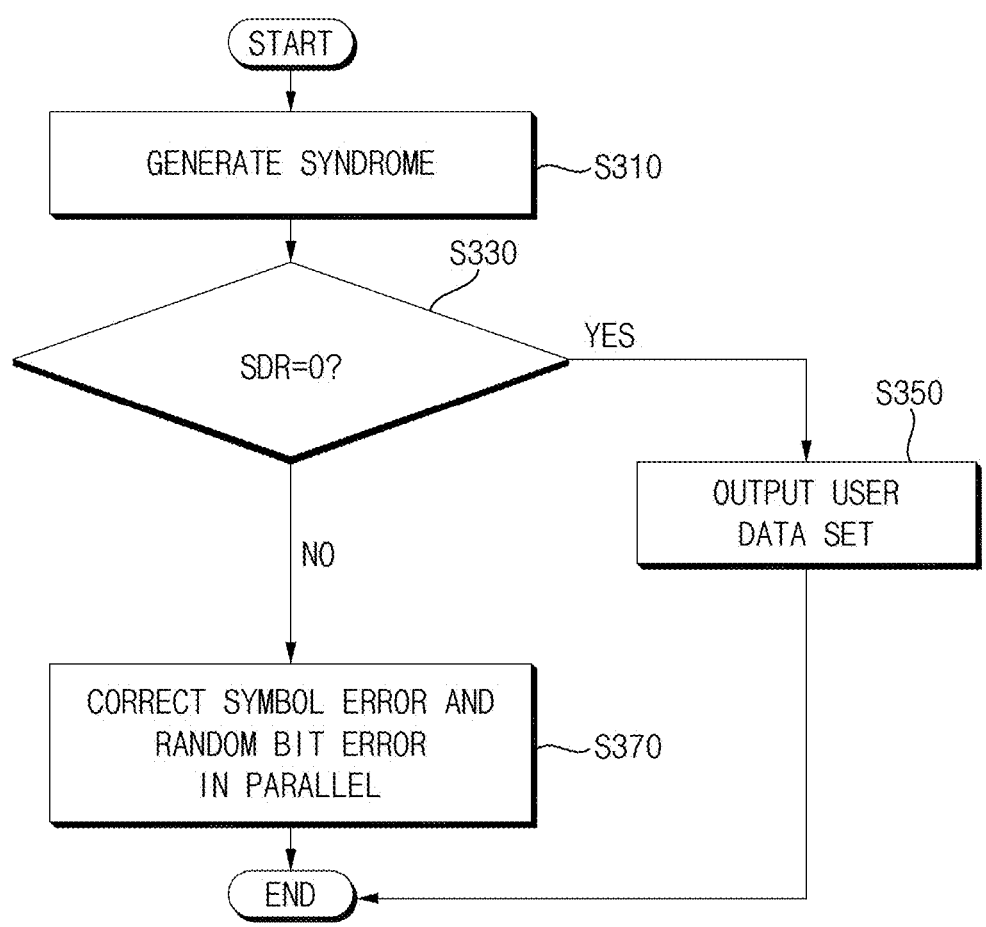
FIG. 18 is a flow chart illustrating an example of an operation of the ECC decoder according to some implementations.

FIG. 18 is a flow chart illustrating an example of an operation of the ECC decoder according to some implementations. In FIGS. 8A through 18, an ECC decoder 430 in a memory controller 100 that controls a memory module MM including plurality of data chips 200a~200p and at least one parity chip 200s, the ECC decoder 430 generates the syndrome SDR by performing a matrix-multiplication operation on the read codeword set SCW2 and a transposition matrix $PCM^T$ of the parity check matrix PCM (operation S310). The parity check matrix PCM may include a first sub check matrix $HS_{21}$, a second sub check matrix $HS_{22}$ and a third sub check matrix $HS_{23}$, and the syndrome SDR may include a first sub syndrome $S_0$, a second sub syndrome $S_1$ and a third sub syndrome $S_2$.

The ECC decoder 430 may determine whether each of syndrome values of the syndrome SDR is zero (operation S330).

When the each of syndrome values of the syndrome SDR is zero (YES in operation S330), the ECC decoder 430 may output a user data set SDQ in the read codeword set SCW2 because the read codeword set SCW2 does not include errors (operation S350).

When the at least one of syndrome values of the syndrome SDR is non-zero (NO in operation S330), the ECC decoder 430 may correct a symbol error and a random (multi) bit error the read codeword set SCW2 in parallel because the read codeword set SCW2 includes errors (operation S400).

Figure 19:
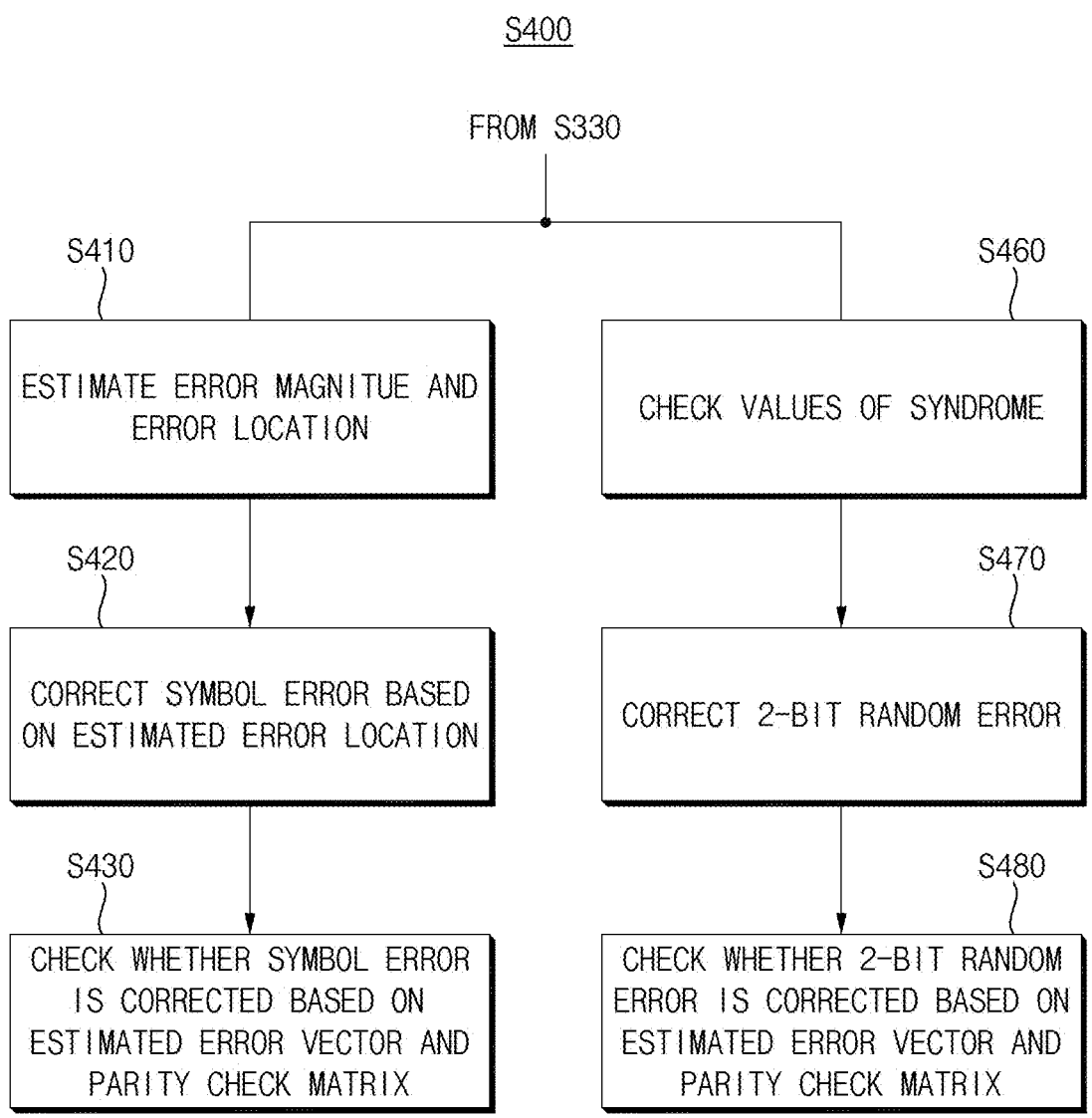
FIG. 19 is a flow chart illustrating an example of an operation of correcting the symbol error and the random bit error in parallel according to some implementations.

FIG. 19 is a flow chart illustrating an example of an operation of correcting the symbol error and the random bit error in parallel according to some implementations. In FIGS. 11, 13 through 17 and 19, the symbol error correction circuit 460 may estimate a magnitude of the symbol error and a location of a target symbol in which the symbol error occurs based on a ratio of the second sub syndrome $S_1$ to the first sub syndrome $S_0$ (operation S410), may correct error of the target symbol among the plurality of symbols of the read codeword set SCW2 based on location information i of the target symbol (operation S420), may output an estimated first error vector $E_1'$, may perform a first vector-multiplication operation on the estimated first error vector $E_1'$ and the transposition matrix $PCM^T$, and may check whether the symbol error is corrected based on a result of the first vector-multiplication operation (operation S430).

In parallel with an operation of the symbol error correction circuit 460, the random error correction circuit 470 may determine whether a first summed value of syndrome values of the first sub syndrome $S_0$ is zero or two, may estimate a location of the multi-bit error based on the second sub s syndrome $S_1$ and the third sub syndrome $S_2$, in response to the first summed value being zero or two, may correct the multi-bit error in the read codeword set SCW2 based on the estimated location (operation S470), may output an estimated second error vector $E_2'$, may perform a second vector-multiplication operation on the estimated second error vector $E_2'$ and the transposition matrix $PCM^T$, and may check whether the double bit error is corrected based on a result of the second vector-multiplication operation (operation S480).

Figure 20:
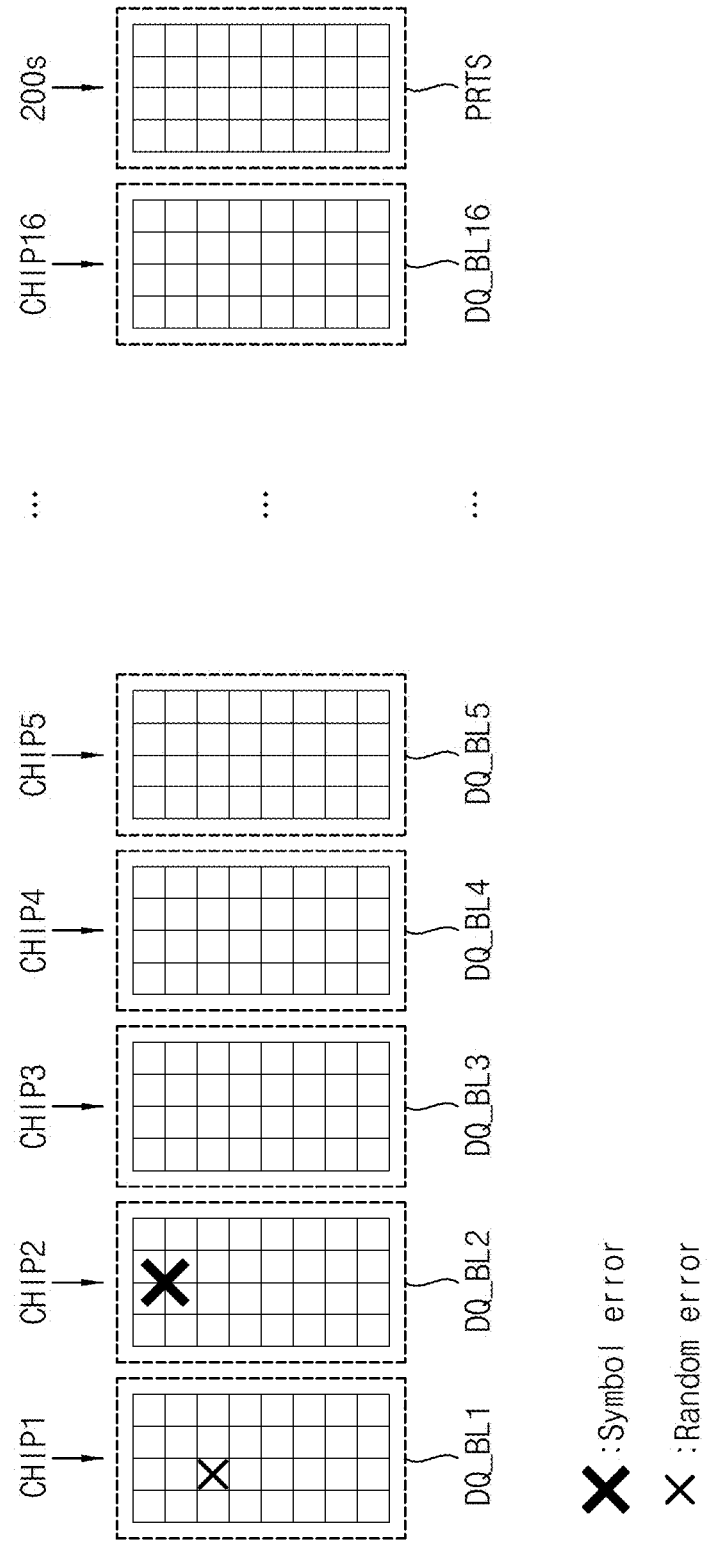
FIGS. 20 through 22 illustrate examples of errors which the ECC decoder may correct according to some implementations.
Figure 21:
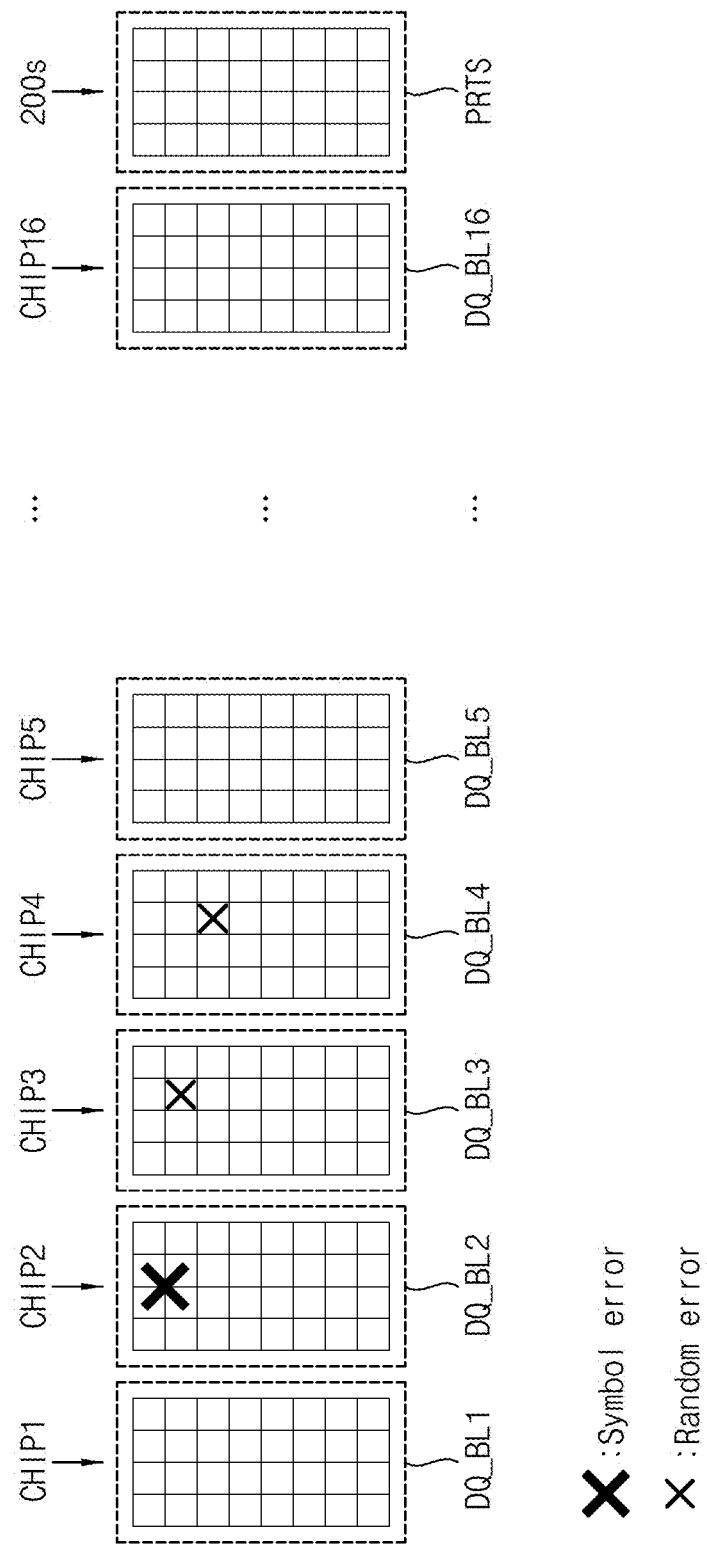
Figure 22:
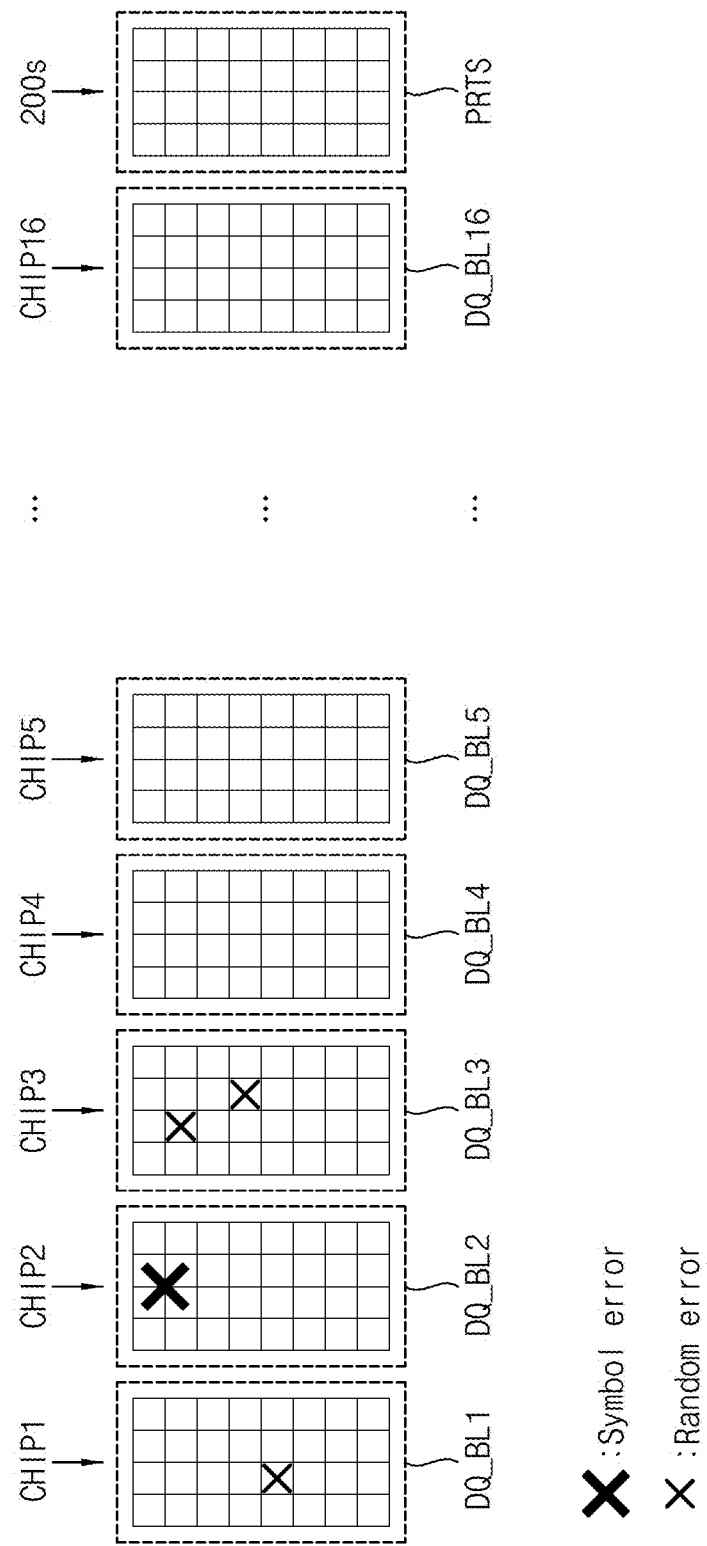

FIGS. 20 through 22 illustrate examples of errors which the ECC decoder may correct according to some implementations. In FIGS. 20 through 22, assuming that chips CHIP1~CHIP16 correspond to the data chip 200a~200p in FIG. 3, each of the chips CHIP1~CHIP16 outputs respective one of data sets DQ_BL1~DQ_BL16, the parity chip 200s outputs the parity data PRTS. In addition, in FIGS. 20 through 22, X denotes a symbol error which occurs in data by symbol basis and x denotes a random error.

In FIG. 20, when the data set DQ_BL2, output from the chips CHIP2, includes one symbol error and the data set DQ_BL1, output from the chips CHIP1 includes a single-bit error, the ECC decoder of FIG. 11 may correct the symbol error, may output the first error flag EF1 indicating that the symbol error is corrected, may not correct the single-bit error and may output the second error flag EF2 indicating that the single-bit error is detected.

In FIG. 21, when the data set DQ_BL2, output from the chips CHIP2, includes one symbol error, the data set DQ_BL3, output from the chips CHIP3 includes a single-bit error and the data set DQ_BL4, output from the chips CHIP4 includes a single-bit error, the ECC decoder of FIG. 11 may correct the symbol error, may output the first error flag EF1 indicating that the symbol error is corrected, may correct the multi-bit error corresponding the single-bit errors in the data sets DQ_BL3 and DQ_BL4 and may output the second error flag EF2 indicating that the multi-bit error is corrected.

In FIG. 22, when the data set DQ_BL2, output from the chips CHIP2, includes one symbol error, the data set DQ_BL1, output from the chips CHIP1 includes a single-bit error and the data set DQ_BL3, output from the chips CHIP3 includes a multi-bitt error, the ECC decoder of FIG. 11 may correct the symbol error, may output the first error flag EF1 indicating that the symbol error is corrected, may correct the multi-bit error and may output the second error flag EF2 indicating that a triple-bit error is detected.

Accordingly, the ECC engine 400 according to example embodiments, may correct the symbol error and the multi-bit error in parallel, and may share a portion of the parity check matrix in performing a RS decoding and a BCH decoding. Accordingly, the ECC engine 400 may reduce complexity of ECC and decoding latency.

Figure 23:
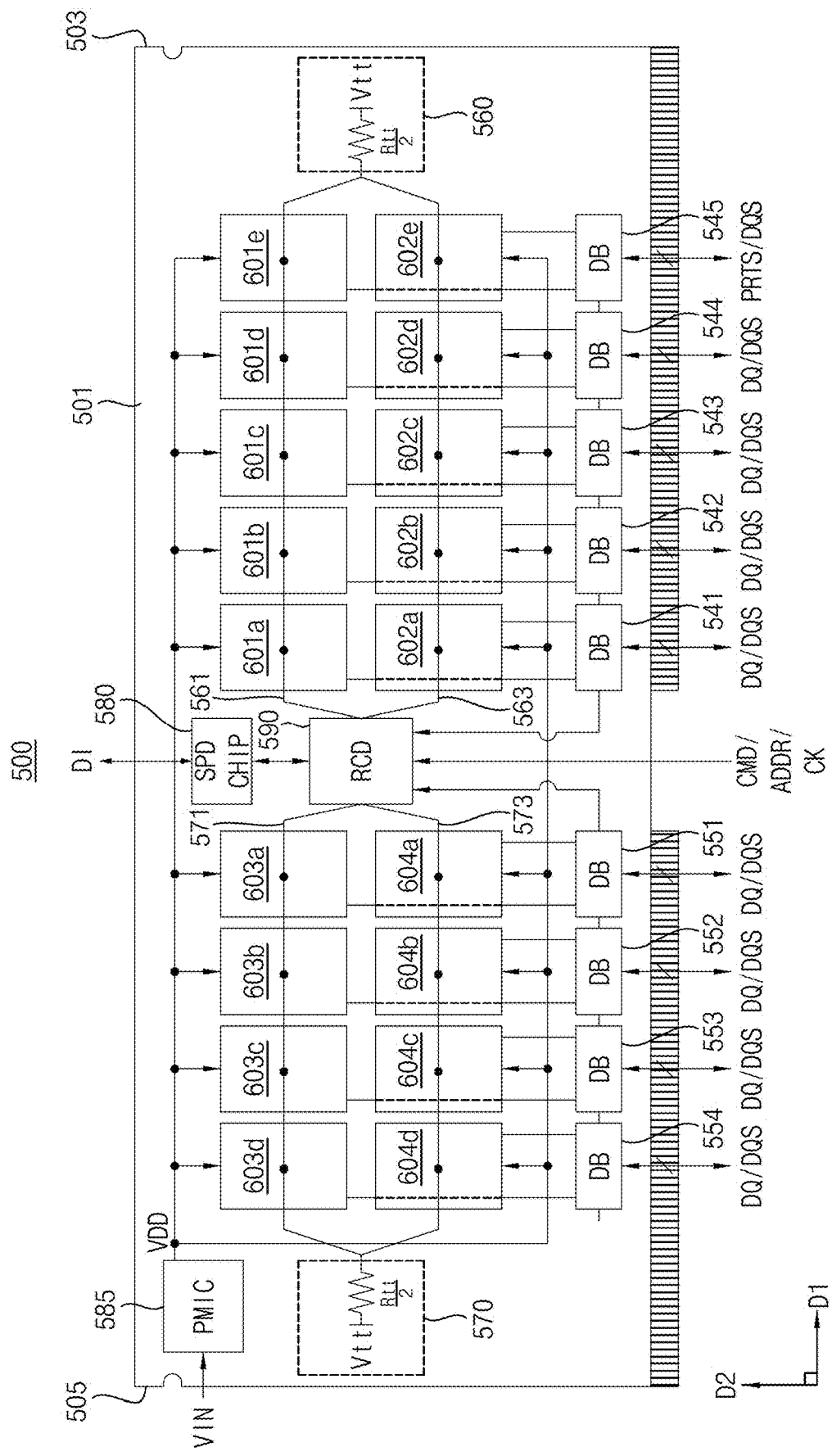
FIG. 23 is a block diagram illustrating an example of a memory module that may be employed by the memory system according to some implementations.

FIG. 23 is a block diagram illustrating an example of a memory module that may be employed by the memory system according to some implementations. In FIG. 23, a memory module 500 may include a registered clock driver (RCD) 590 disposed in or mounted on a circuit board 501, a plurality of semiconductor memory devices 601a~601e, 602a~602e, 603a~603d, and 604a~604d, a plurality of data buffers 541~545 and 551~554, module resistance units 560 and 570, a serial present detect (SPD) chip 580, and a power management integrated circuit (PMIC) 585.

The RCD 590 may control the semiconductor memory devices 601a~601e, 602a~602e, 603a~603d, and 604a~604d and the PMIC 585 under control of the memory controller 100. For example, the RCD 590 may receive an address ADDR, a command CMD, and a clock signal CK from the memory controller 100.

The SPD chip 580 may be a programmable read only memory (e.g., EEPROM). The SPD chip 580 may include initial information or device information DI of the memory module 500. In example embodiments, the SPD chip 580 may include the initial information or the device information DI such as a module form, a module configuration, a storage capacity, a module type, an execution environment, or the like of the memory module 500.

When a memory system including the memory module 500 is booted up, the memory controller 100 may read the device information DI from the SPD chip 580 and may recognize the memory module 500 based on the device information DI. The memory controller 100 may control the memory module 500 based on the device information DI from the SPD chip 580. For example, the memory controller 100 may recognize a type of the semiconductor memory devices included in the memory module 500 based on the device information DI from the SPD chip 580.

Here, the circuit board 501 which is a printed circuit board may extend in a first direction D1, perpendicular to a second direction D2, between a first edge portion 503 and a second edge portion 505. The first edge portion 503 and the second edge portion 105 may extend in the second direction D2.

The RCD 590 may be disposed on a center of the circuit board 501. The plurality of semiconductor memory devices 601a~601e, 602a~602e, 603a~603d, and 604a~604d may be arranged in a plurality of rows between the RCD 590 and the first edge portion 503 and between the RCD 590 and the second edge portion 505.

In this case, the semiconductor memory devices 601a~601e and 602a~602e may be arranged along a plurality of rows between the RCD 590 and the first edge portion 503. The semiconductor memory devices 603a~603d, and 604a~604d may be arranged along a plurality of rows between the RCD 590 and the second edge portion 505. The semiconductor memory devices 601a~601d, 602a~602d, 603a~603d, and 604a~604d may be referred to data chip and the semiconductor memory devices 601e and 602e may be referred to as first and second parity chips respectively.

Each of the plurality of semiconductor memory devices 601a~601d, 602a~602d, 603a~603d, and 604a~604d may be coupled to a corresponding one of the data buffers 541~544 and 551~554 through a data transmission line for receiving/transmitting data signal DQ and data strobe signal DQS. Each of the semiconductor memory devices 601e and 602e may be coupled to the data buffer 545 through a data transmission line for receiving/transmitting parity data PRTS and the data strobe signal DQS.

The RCD 590 may provide a command/address signal (e.g., CA) to the semiconductor memory devices 601a~601e through a command/address transmission line 561 and may provide a command/address signal to the semiconductor memory devices 602a~602e through a command/address transmission line 563.

In addition, the RCD 590 may provide a command/address signal to the semiconductor memory devices 603a~603d through a command/address transmission line 571 and may provide a command/address signal to the semiconductor memory devices 604a~604d through a command/address transmission line 573.

The command/address transmission lines 561 and 563 may be connected in common to the module resistance unit 560 disposed to be adjacent to the first edge portion 503, and the command/address transmission lines 571 and 573 may be connected in common to the module resistance unit 570 disposed to be adjacent to the second edge portion 505.

Each of the module resistance units 560 and 570 may include a termination resistor Rtt/2 connected to a termination voltage Vtt. In this case, an arrangement of the module resistance units 560 and 570 may reduce the number of the module resistance units, thus reducing an area where termination resistors are disposed.

In addition, each of the plurality of semiconductor memory devices 601a~601e, 602a~602e, 603a~603d, and 604a~604d may be a DRAM device.

The SPD chip 580 may be disposed to be adjacent to the RCD 590 and the PMIC 585 may be disposed between the semiconductor memory device 603d and the second edge portion 505. The PMIC 585 may generate a power supply voltage VDD based on an input voltage VIN and may provide the power supply voltage VDD to the semiconductor memory devices 601a~601e, 602a~602e, 603a~603d, and 604a~604d.

Although it is illustrated as the PMIC 585 is disposed to be adjacent to the second edge portion 505 in FIG. 23, the PMIC 585 may be disposed in a central portion of the circuit board 501 to be adjacent to the RCD 590 in example embodiments.

Figure 24:
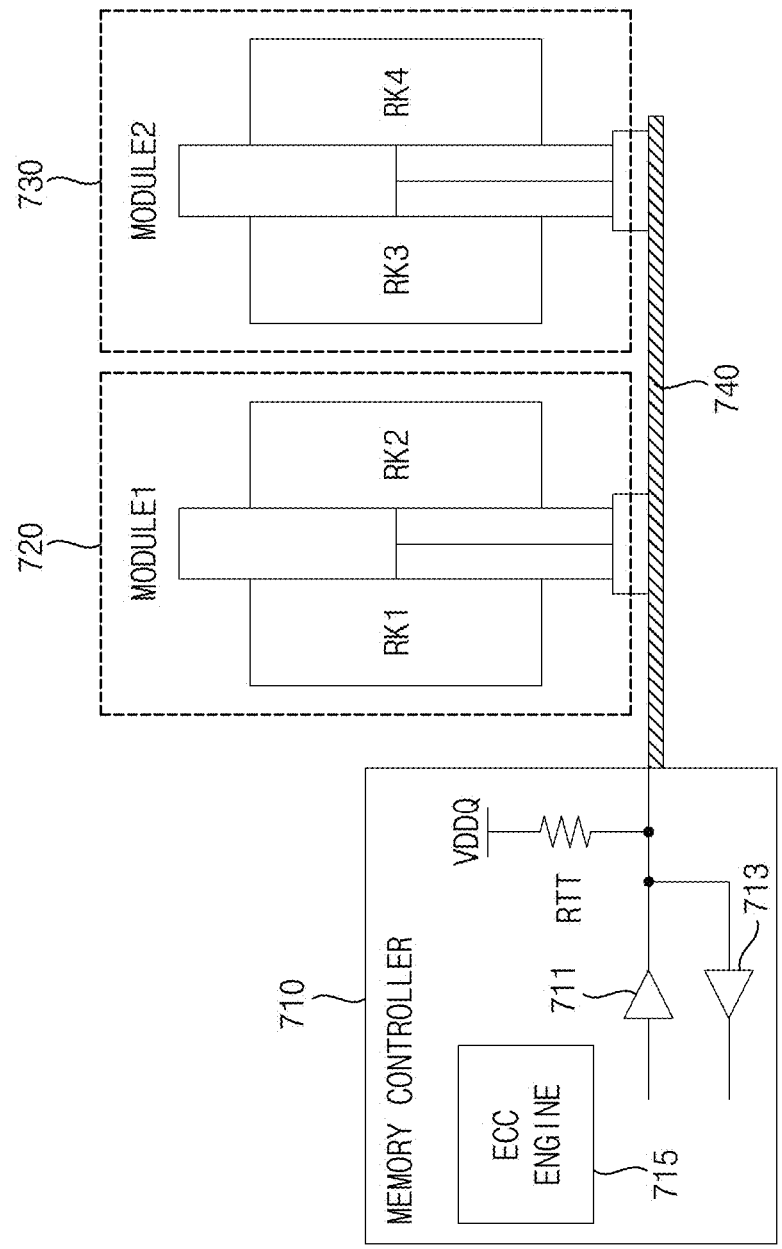
FIG. 24 is a block diagram illustrating an example of a memory system having quad-rank memory modules according to some implementations.

FIG. 24 is a block diagram illustrating an example of a memory system having quad-rank memory modules according to some implementations. In FIG. 24, a memory system 700 may include a memory controller 710 and at least one or more memory modules 720 and 730.

The memory controller 710 may control a memory module 720 and/or 730 so as to perform a command supplied from a processor or host. The memory controller 710 may be implemented in a processor or host, or may be implemented with an application processor or a system-on-a-chip (SoC). The memory controller 710 may include a transmitter 711, to transmit a signal to the at least one or more memory modules 720 and 730, and a receiver 713 to receive a signal from the at least one or more memory modules 720 and 730. For signal integrity, a source termination may be implemented with a resistor RTT on a bus 740 of the memory controller 710. The resistor RTT may be coupled to a power supply voltage VDDQ. The memory controller 710 may include an ECC engine 715 and the ECC engine 715 may employ the ECC engine 400 of FIG. 6.

Accordingly, the ECC engine 715 may include an ECC encoder and an ECC decoder. The ECC decoder may perform a first ECC decoding to correct the symbol error and a second ECC decoding to correct the multi-bit error in parallel, and may share a portion of the parity check matrix in performing the first ECC decoding and the second ECC decoding. Accordingly, the ECC engine 715 may reduce complexity of ECC and decoding latency.

The at least one or more memory modules 720 and 730 may be referred to as a first memory module 720 and a second memory module 730. The first memory module 720 and the second memory module 730 may be coupled to the memory controller 710 through the bus 740. Each of the first memory module 720 and the second memory modules 730 may correspond to the memory module MM in FIG. 1. The first memory module 720 may include at least one or more memory ranks RK1 and RK2, and the second memory module 730 may include one or more memory ranks RK3 and RK4.

Each of the first memory module 720 and the second memory module 730 may include a plurality of data chips and at least one parity chip.

Figure 25:
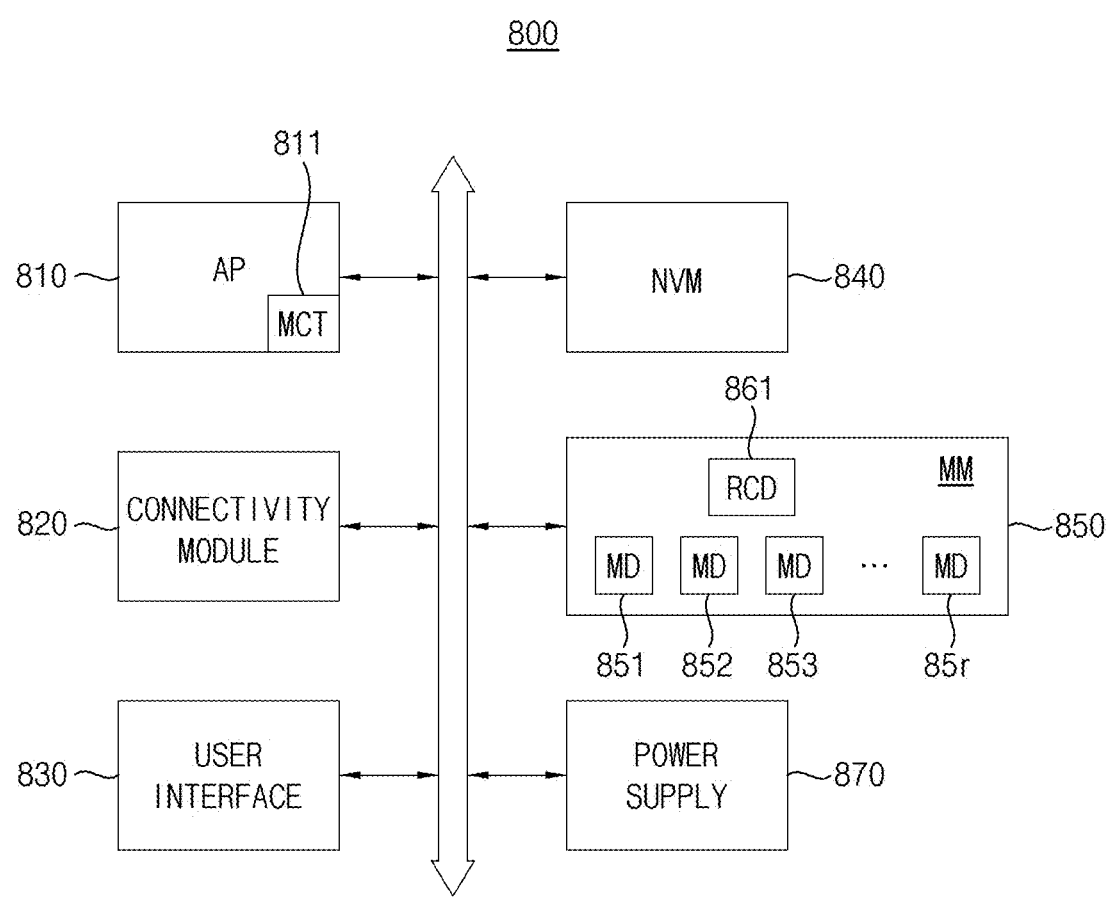
FIG. 25 is a block diagram illustrating an example of a mobile system including a memory module according to some implementations.

FIG. 25 is a block diagram illustrating an example of a mobile system including a memory module according to some implementations. In FIG. 25, a mobile system 800 may include an application processor 810, a connectivity module 820, a memory module MM 850, a nonvolatile memory device 840, a user interface 830, and a power supply 870. The application processor 810 may include a memory controller (MCT) 811. The memory controller 811 may include the ECC engine 400 of FIG. 6.

The application processor 810 may execute applications, such as a web browser, a game application, a video player, etc. The connectivity module 820 may perform wired or wireless communication with an external device.

The memory module 850 may store data processed by the application processor 810 or operate as a working memory. The memory module 850 may include a plurality of semiconductor memory devices MD 851, 852, 853, and 85r (where r is a positive integer greater than three), and a RCD 861.

The semiconductor memory devices 851, 852, 853, and 85r may include a plurality of data chips and at least one parity chip. Therefore, the ECC engine in the memory controller 811 may perform a first ECC decoding to correct the symbol error and a second ECC decoding to correct the multi-bit error in parallel, and may share a portion of the parity check matrix in performing the first ECC decoding and the second ECC decoding. Accordingly, the ECC engine may reduce complexity of ECC and decoding latency.

The nonvolatile memory device 840 may store a boot image for booting the mobile system 800. The user interface 830 may include at least one input device, such as a keypad, a touch screen, etc., and at least one output device, such as a speaker, a display device, etc. The power supply 870 may supply an operating voltage to the mobile system 800.

The mobile system 800 or components of the mobile system 800 may be mounted using various types of packages.

Figure 26:
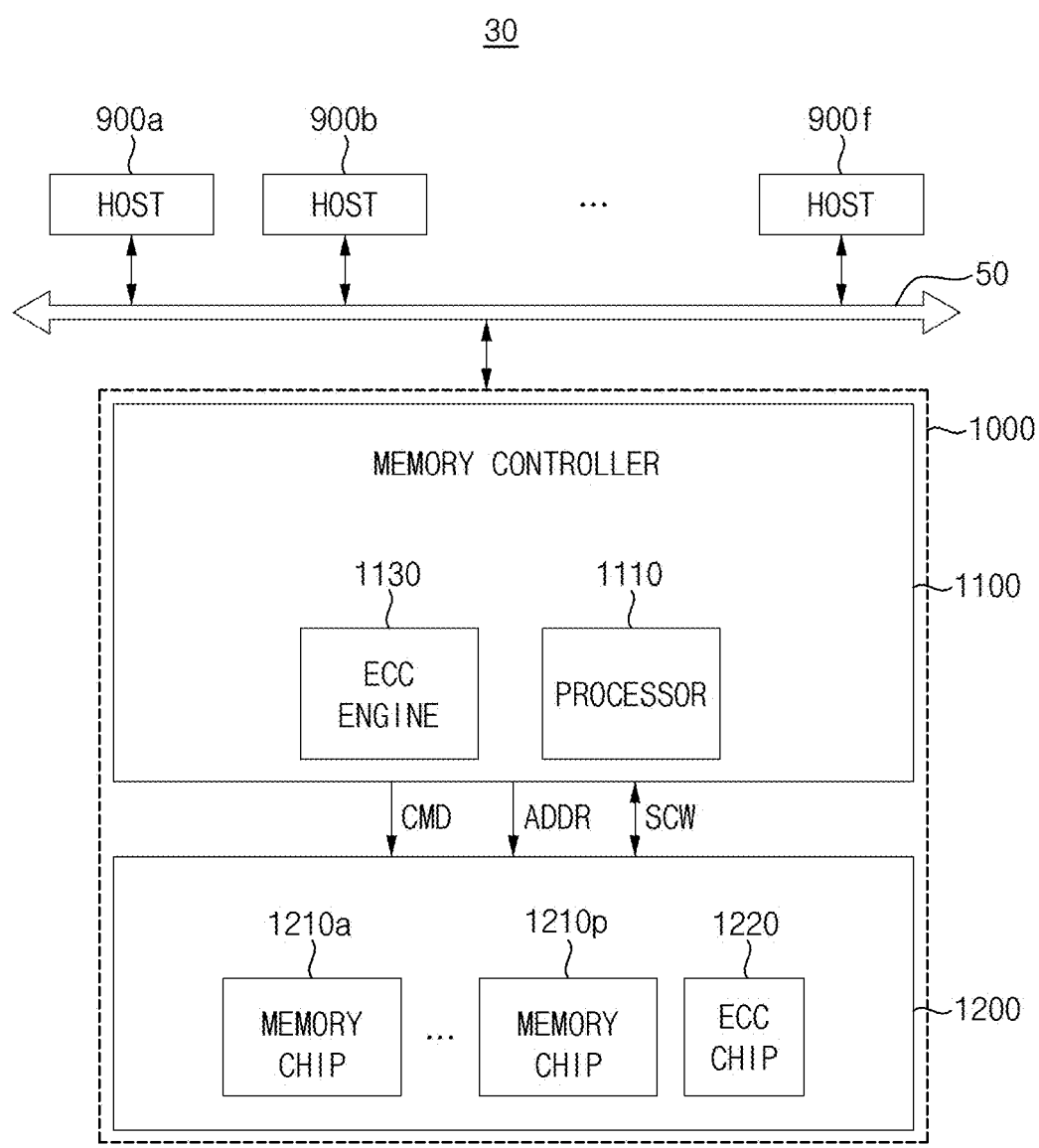
FIG. 26 is a block diagram illustrating an example of a computing system according to some implementations.

FIG. 26 is a block diagram illustrating an example of a computing system according to some implementations. In FIG. 26, a computing system 30 may include a plurality of hosts 900a, 900b, . . . , 900f and a memory system 1000 and the memory system 1000 may include a memory controller 1100 and a memory module 1200. Here, f is a natural number greater than two.

The memory module 1200 may include a plurality of data chips 1210a~1210p and at least one parity chip 1220. The at least one parity chip 1220 may be referred to as an ECC chip.

The memory controller 1100 may apply a command CMD and an address ADDR to the memory module 1200, may exchange a codeword set SCW with the memory module 1200. The memory controller 1100 may include a processor 1110 and an ECC engine 1130.

The processor 1110 may control overall operation of the memory controller 1100.

The ECC engine 1130 may perform an ECC encoding on a user data set to generate a parity data set and may provide the memory module 1200 with the codeword set SCW including the user data set and the parity data set in a write operation.

The ECC engine 1130, in a read operation, may perform a first ECC decoding to correct the symbol error in the codeword set SCW and a second ECC decoding to correct the multi-bit error in the codeword set SCW in parallel, and may share a portion of the parity check matrix in performing the first ECC decoding and the second ECC decoding. Accordingly, the ECC engine 1130 may reduce complexity of ECC and decoding latency.

The memory controller 1100 may be connected to the plurality of hosts 900a, 900b, . . . , 900f through a compute express link (CXL) bus 50 and may control the plurality of data chips 1210a~1210p and the at least one parity chip 1220 by communicating the plurality of hosts 900a, 900b, . . . , 900f through the CXL interface.

In some implementations, the CXL bus 50 may support a plurality of CXL protocols and messages and/or data may be transmitted through the plurality of CXL protocols. For example, the plurality of CXL protocols may include a non-coherent protocol (or and I/O protocol CXL.io), a coherent protocol (or a cache protocol CXL.cache), and a memory access protocol (or a memory protocol CXL.memory). In some embodiments, the CXL bus 50 may support protocols such as peripheral component interconnection (PCI), PCI express (PCIe), universal serial bus (USB), and serial advanced technology attachment (SATA). A protocol supported by the CXL bus 50 may referred to as an interconnect protocol.

The memory controller 1100 may refer to a device that provides functions to the plurality hosts 900*a*, 900*b*, . . . , 900*f*. Based on the CXL specification 2.0, the memory controller 1100 may be an accelerator that supports the CXL specification. For example, at least some of computing operations and I/O operations executed in the plurality hosts 900*a*, 900*b*, . . . , 900*f* may be off-loaded to the memory controller 1100. In some embodiments, the each of the plurality hosts 900*a*, 900*b*, . . . , 900*f* may include any one or any combination of a programmable component (e.g., a graphic processing unit (GPU) and a neural processing unit (NPU), a component (e.g., an intellectual property (IP) core) that provides a fixed function and a reconfigurable component (e.g., a field programmable gate array (FPGA)).

Figure 27:
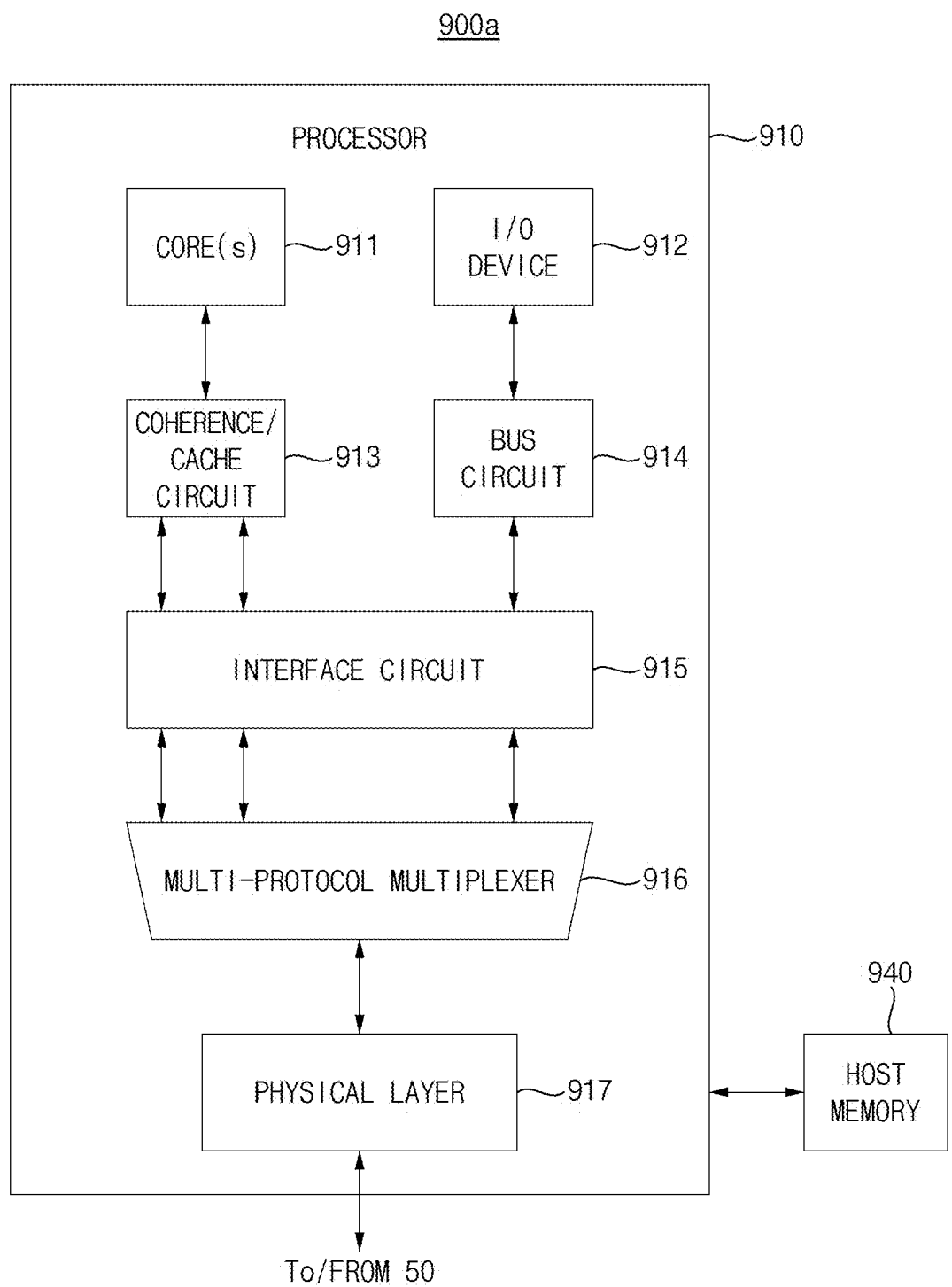
FIG. 27 is a block diagram illustrating an example of one of the plurality hosts in the computing system of FIG. 28 according to some implementations.
Figure 28:
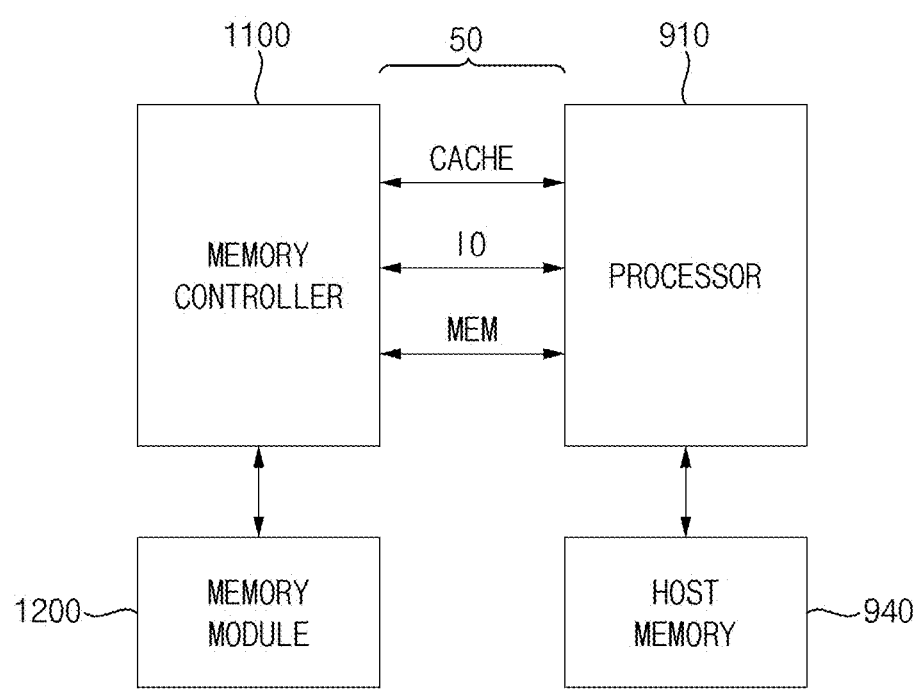
FIG. 28 illustrates an example of a multi-protocol for communication in the computing system of FIG. 26 according to some implementations.

FIG. 27 is a block diagram illustrating an example of one of the plurality hosts in the computing system of FIG. 28 according to some implementations. In FIG. 27, a configuration of the host 900*a* from among the plurality hosts 900*a*, 900*b*, . . . , 900*f* and each configuration of the hosts 900*b*, . . . , 900*f* may be substantially the same as the configuration of the host 900*a*. The host 900*a* may include a processor 910 and a host memory 940.

The processor 910 may be a central processing unit (CPU) of the host 900*a*. In some embodiments, the processor 910 may be a CXL-based processor. As illustrated in FIG. 28, the processor 910 may be connected to the host memory 940 and may include a physical layer 917, a multi-protocol multiplexer 916, an interface circuit 915, a coherence/cache circuit 913, a bus circuit 914, at least one core 911 and an I/O device 912.

The at least one core 911 may execute an instruction and be connected to the coherence/cache circuit 913. The coherence/cache circuit 913 may include a cache hierarchy and may be referred to as a coherence/cache logic. In FIG. 28, the coherence/cache circuit 913 may communicate with the at least one core 911 and interface circuit 915. For example, the coherence/cache circuit 913 may enable communicate through at least protocols including a coherent protocol and a memory access protocol. In some implementations, the coherence/cache circuit 913 may include a direct memory access (DMA) circuit. The I/O device 912 may be used to communicate with the bus circuit 914. For example, the bus circuit 914 may be a PCIe logic and the I/O device 912 may be a PCIe I/O device.

The interface circuit 915 may enable communication between components (e.g., the coherence/cache circuit 913 and the bus circuit 914) of the processor 910 and the memory system 1000. In some implementations, the interface circuit 915 may enable communication between components of the processor 910 and the memory system 1000 according to a plurality of protocols (e.g., a non-coherent protocol, the coherent protocol and the memory access protocol). For example, the interface circuit 915 may determine one of the plurality of protocols based on messages and data for communication between the components of the processor 910 and the memory system 1000.

The multi-protocol multiplexer 916 may include at least one protocol queue. The interface circuit 915 may be connected to the at least one protocol queue and transmit and receive messages and/or data to and from the memory system 1000 through the least one protocol queue. In some implementations, the interface circuit 915 and the multi-protocol multiplexer 916 may be integrally formed into one component. In some implementations, the multi-protocol multiplexer 916 may include a plurality of protocol queues corresponding respectively to the plurality of protocols supported by the CXL bus 50. In some implementations, the multi-protocol multiplexer 916 may arbitrate communications of different protocols and provide selected communications the physical layer 917.

FIG. 28 illustrates an example of a multi-protocol for communication in the computing system of FIG. 26 according to some implementations. In FIG. 28, the processor 910 and the memory controller 1100 may communicate with each other based on a plurality of protocols.

According to the above-mentioned CXL examples, the plurality of protocols may include a memory protocol MEM, a coherent protocol CACHE and a non-coherent protocol IO. The memory protocol MEM may define a transaction from a master to a subordinate and a transaction from the subordinate to the master. The coherent protocol CACHE may define interactions between the memory controller 1100 and the processor 910. For example, an interface of the coherent protocol CACHE may include three channels including a request, a response and data. The non-coherent protocol IO may provide a non-coherent load/store for I/O devices.

The memory controller 1100 may communicate with the memory module 1200 and the processor 910 may communicate with the host memory 940.

Figure 29:
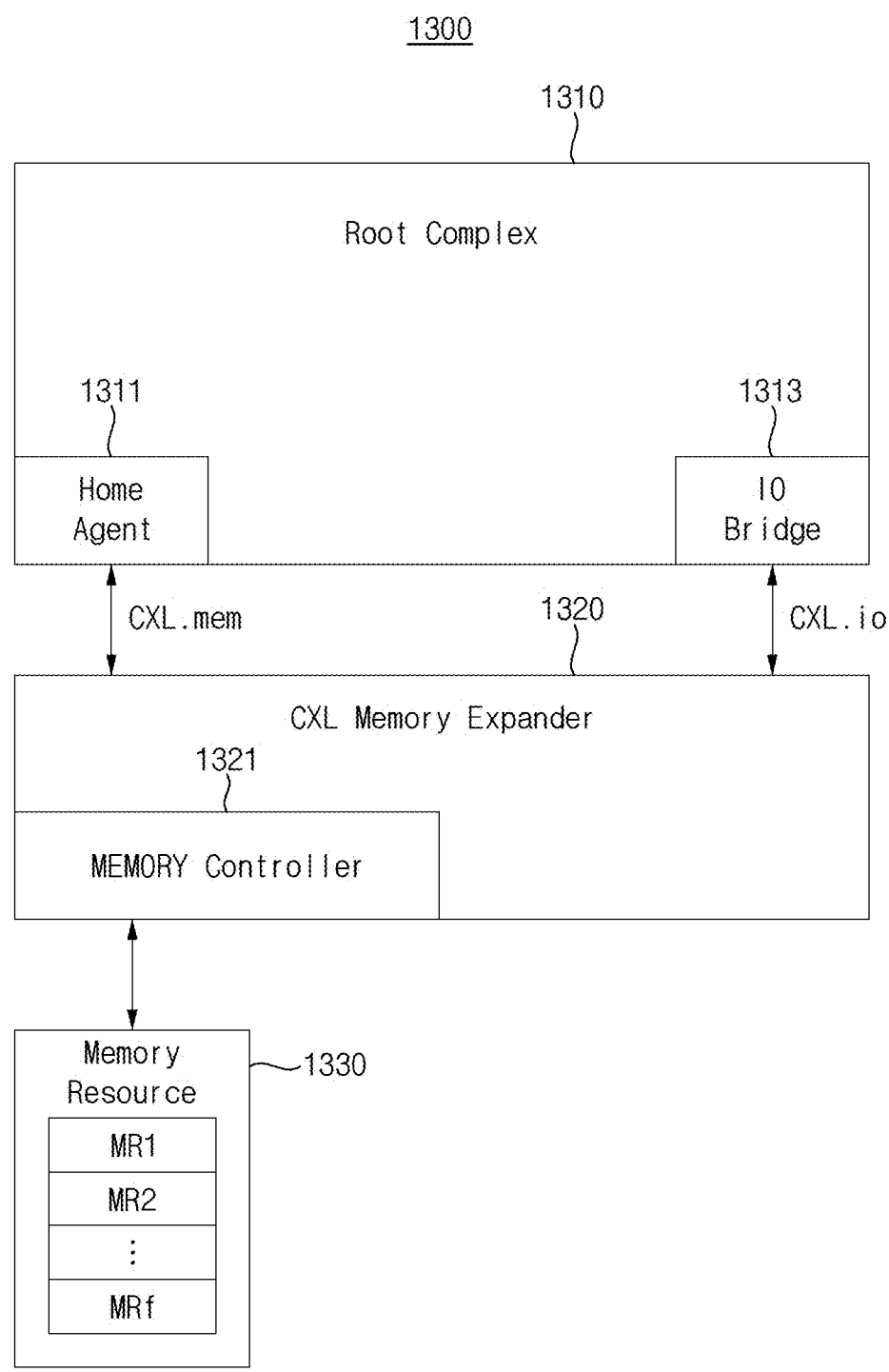
FIG. 29 is an example of a computing system when a memory system according to example embodiments corresponds to a Type 3 memory system defined by a CXL protocol according to some implementations.

FIG. 29 is an example of a computing system when a memory system according to example embodiments corresponds to a Type 3 memory system defined by a CXL protocol according to some implementations. In FIG. 29, a computing system 1300 may include a root complex 1310, a CXL memory expander 1320 connected to the root complex 1310 and a memory resource 1330.

The root complex 1310 may include a home agent 1311 and an I/O bridge 1313, and the home agent 1310 may communicate with the CXL memory expander 1320 based on a coherent protocol CXL.mem the I/O bridge 1313 may communicate with the CXL memory expander 1320 based on a non-coherent protocol, i.e., an I/O protocol CXL.io. In a CXL protocol base, the home agent 1310 may correspond to an agent on a host side that is arranged to solve the entire consistency of the computing system 1300 for a given address.

The CXL memory expander 1320 may include a memory controller 1321 and the smart controller 1321 may employ the memory controller 1100 in FIG. 26. In addition, the CXL memory expander 1320 may output data to the root complex 1310 via the I/O bridge 1313 based on the I/O protocol CXL.io or the PCIe.

The memory resource 1330 may include a plurality of memory regions MR1, MR2, . . . , MRf and each of the plurality of memory regions MR1, MR2, . . . , MRf may be implemented as a memory of a various units.

Figure 30:
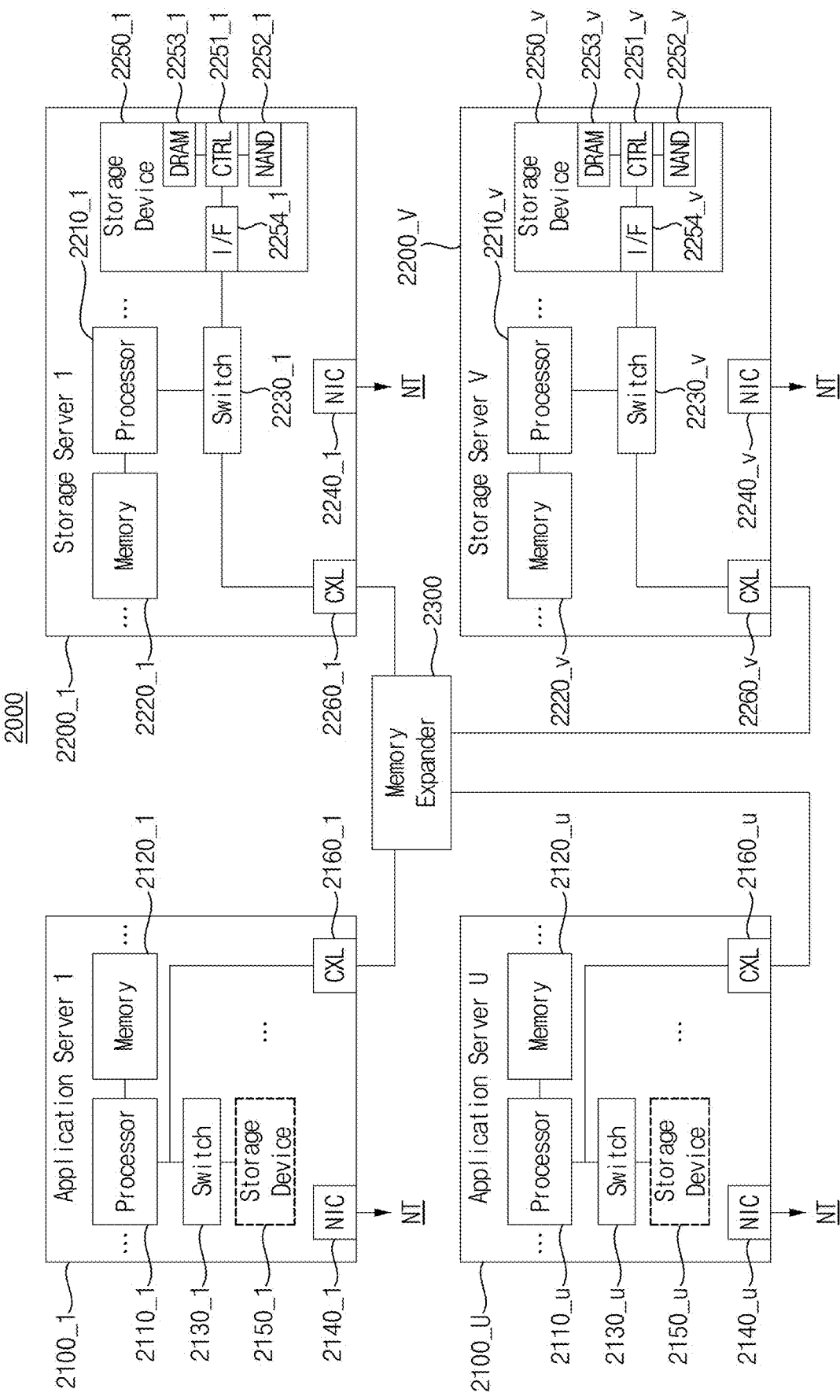
FIG. 30 is a block diagram illustrating a data center including a computing system according to some implementations.

FIG. 30 is a block diagram illustrating a data center including a computing system according to some implementations. In FIG. 30, a data center 2000 may be a facility that collects various types of data and provides various services, and may be referred to as a data storage center. The data center 2000 may be a system for operating search engines and databases, and may be a computing system used by companies, such as banks or government agencies. The data center 2000 may include application servers 2100_1 to 2100_U and storage servers 2200_1 to 2200_V. The number of the application servers 2100_1 to 2100_U and the number of the storage servers 2200_1 to 2200_V may be variously selected according to some implementations, and the number of the application servers 2100_1 to 2100_U and the number of the storage servers 2200_1 to 2200_V m may be different from each other.

Below, for convenience of description, an example of the storage server 2200_1 will be described.

The storage server 2200_1 may include a processor 2210_1, a memory 2220_1, a switch 2230_1, a network interface controller (NIC) 2240_1, a storage device 2250_1 and CXL interface 2260_1. The storage server 2200_V may include a processor 2210_v, a memory 2220_v, a switch 2230_v, a NIC 2240_v, a storage device 2250_v and CXL interface 2260_v.

The processor 2210_1 may control overall operation of the storage server 2200_1. The memory 2220_1 may store various instructions or data under control of the processor 2210_1. The processor 2210_1 may be configured to access the memory 2220_1 to execute various instructions or to process data. In some implementations, the memory 2220_1 may include at least one of various kind of memory devices such as double data rate synchronous DRAM (DDR SDRAM), high bandwidth memory (HBM), hybrid memory cube (HMC), dual in-line memory module (DIMM), Optane DIMM or non-volatile DIMM.

In some implementations, the number of the processors 2210_1 included in the storage server 2200_1 and the number of the memories 2220_1 included in the storage server 2200_1 may be variously changed or modified. In an embodiment, the processor 2210_1 and the memory 2220_1 included in the storage server 2200_1 may constitute a processor-memory pair and the number of processor-memory pairs included in the storage server 2200_1 maybe variously changed or modified. In an embodiment, the number of the processors 2210_1 included in the storage server 2200_1 and the number of the memories 2220_1 included in the storage server 2200_1 may be different. The processor 2210_1 may include a single core processor and a multi-core processor.

Under control of the processor 2210_1, the switch 2230_1 may selectively connect the processor 2210_1 and the storage device 2250_1 or may selectively connect the NIC 2240-1, the storage device 2250_1 and the CXL 2260_1.

The NIC 2240_1 may connect the storage server 2220_1 with a network NT. The NIC 2240_1 may include a network interface card, a network adapter, and the like. The NIC 2240_1 may be connected to the network NT through a wired interface, a wireless interface, a Bluetooth interface, or an optical interface. The NIC 2240_1 may include an internal memory, a digital signal processor (DSP), a host bus interface, and the like and may be connected with the processor 2210_1 or the switch 2230_1 through the host bus interface. The host bus interface may include at least one of various interface schemes such as an advanced technology attachment (ATA), a serial ATA (SATA) an external SATA (e-SATA), a small computer system interface (SCSI), a serial attached SCSI (SAS), a peripheral component interconnection (PCI), a PCI express (PCIe), an NVMe, a compute express link (CXL), an IEEE 1394, a universal serial bus (USB), a secure digital (SD) card interface, a multimedia card (MMC) interface, an embedded MMC (eMMC) interface, a universal flash storage (UFS) interface, an embedded UFS (eUFS) interface, a compact flash (CF) card interface, etc. In an embodiment, the NIC 2240_1 may be integrated with at least one of the processor 2210_1, the switch 2230_1 and the storage device 2250_1.

Under control of the processor 2210_1, the storage device 2250_1 may store data or may output the stored data. The storage device 2250_1 may include a controller CTRL 2251_1, a nonvolatile memory NAND 2252_1, a DRAM 2253_1 and an interface I/F 2254_1. In an embodiment, the storage device 2250_1 may further include a secure element SE for security or privacy. The storage device 2250_v may include a controller CTRL 2251_v, a nonvolatile memory NAND 2252_v, a DRAM 2253_v and an interface I/F 2254_v. In an embodiment, the storage device 2250_v may further include a secure element SE for security or privacy.

The controller 2251_1 may control overall operation of the storage device 2250_1. The controller 2251_1 may include an SRAM. In response to signals received through the interface 2254_1, the controller 2251_1 may store data in the nonvolatile memory 2252_1 or may output data stored in the nonvolatile memory 2252_1. The controller 2251_1 may be configured to control the nonvolatile memory 2252_1 based on a toggle interface or an ONFI.

The DRAM 2253_1 may be configured to temporarily store data to be stored in the nonvolatile memory 2252_1 or data read from the nonvolatile memory 2252_1. The DRAM 2253_1 may be configured to store various data (e.g., metadata and mapping data) necessary of the controller 2251_1 to operate. The interface 2254_1 may provide a physical connection between the controller 2251_1 and the processor 2210_1, the switch 2230_1 or the NIC 2240_1. The interface 2254_1 may be implemented to support direct-attached storage (DAS) manner that allows the direct connection of the storage device 2250_1 through a dedicated cable. The interface 2254_1 may be implemented based on at least one of various above-described interfaces through a host interface bus.

The above components of the storage server 2200_1 are provided as an example, and the present disclosure is not limited thereto. The above components of the storage server 2200_1 may be applied to each of the other storage servers or each of the application servers 2100_1 to 2100_U. In each of the application servers 2100_1 to 2100_U, a storage device 2150_1 may be selectively omitted.

The application server 2100_1 may include a processor 2110_1, a memory 2120_1, a switch 2130_1, a NIC 2160_1, and CXL interface 2160_1. The application server 2100_U may include a processor 2110_u, a memory 2120_u, a switch 2130_u, a NIC 2160_u, and CXL interface 2160_u.

The application servers 2100_1 to 2100_U and the storage servers 2200_1 to 2200_V may communicate with each other through the network NT. The network NT may be implemented using a fiber channel (FC) or an Ethernet. The FC may be a medium used for a relatively high speed data transmission, and an optical switch that provides high performance and/or high availability may be used. The storage servers 2200_1 to 2200_V may be provided as file storages, block storages or object storages according to an access scheme of the network NT.

In some implementations, the network NT may be a storage-only network or a network dedicated to a storage such as a storage area network (SAN). For example, the SAN may be an FC-SAN that uses an FC network and is implemented according to an FC protocol (FCP). For another example, the SAN may be an IP-SAN that uses a transmission control protocol/internet protocol (TCP/IP) network and is implemented according to an iSCSI (a SCSI over TCP/IP or an Internet SCSI) protocol. In some implementations, the network NT may be a general network such as the TCP/IP network. For example, the network NT may be implemented according to at least one of protocols such as an FC over Ethernet (FCOE), a network attached storage (NAS), a nonvolatile memory express (NVMe) over Fabrics (NVMe-oF), etc.

In some implementations, at least one of the plurality of application servers 2100_1 to 2100_U may be configured to access at least one of the remaining application servers or at least one of the storage servers 2200_1 to 2200_V over the network NT. For example, the application server 2100_1 may store data requested by s user or a client in at least one of the storage servers 2200_1 to 2200_V over the network NT. Alternatively, the application server 2100_1 may obtain data requested by s user or a client in at least one of the storage servers 2200_1 to 2200_V over the network NT. In this case, the application server 2100_1 may be implemented with a web server, a database management system (DBMS), or the like.

The application server 2100_1 may access a memory 2120_1 or a storage device 2105_1 of the application server 2100_1 or the storage device 2250_1 of the storage server 2000_1 over the network NT. As such, the application server 2100_1 may perform various operations on data stored in the application servers 2100_1 to 2100_U and/or the storage servers 2200_1 to 2200_V. For example, the application server 2100_1 may execute a command for moving or copying data between the application servers 2100_1 to 2100_U and/or the storage servers 2200_1 to 2200_V. The data may be transferred from the storage devices 2250_1 to 2250_v of the storage servers 2200_1 to 2200_V to the memories 2120_1 to 2120_u of the application servers 2100_1 to 2100_U directly or through the memories 2220_1 to 2220_v of the storage servers 2200_1 to 2200_V. For example, the data transferred through the network NT may be encrypted data for security or privacy.

The storage servers 2200_1 to 2200_V and the application servers 2100_1 to 2100_U may be connected with a memory expander 2300 through the CXL interfaces 2260_1 to 2260_v and 2160_1 to 2160_u. The memory expander 2300 may be used as expanded memory of each of the storage servers 2200_1 to 2200_V and the application servers 2100_1 to 2100_U or virtualized component included therein may communicate with each other through the CXL interfaces 2260_1 to 2260_v and 2160_1 to 2160_u and the memory expander 2300.

The present disclosure may be applied to various electronic devices and systems that include memory modules and memory systems. For example, the present disclosure may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

While this disclosure contains many specific implementation details, these should not be construed as limitations on the scope of what may be claimed. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a combination can in some cases be excised from the combination, and the combination may be directed to a subcombination or variation of a subcombination.

What is claimed is:

1. A memory controller comprising:
an error correction code (ECC) engine; and
a processor configured to control the ECC engine,
wherein the ECC engine includes an ECC decoder configured to:
perform a first ECC decoding to correct a symbol error in a read codeword set read from a memory module by using a first sub check matrix and a second sub check matrix of a parity check matrix, the memory module including a plurality of data chips and at least one parity chip; and
perform a second ECC decoding to correct a multi-bit error and to detect a triple-bit error in the read codeword set by using the second sub check matrix and a third sub check matrix of the parity check matrix, in parallel with performing the first ECC decoding,
wherein the ECC decoder is configured to:
generate a syndrome including a first sub syndrome, a second sub syndrome, and a third sub syndrome based on the parity check matrix and the read codeword set;
correct the symbol error based on comparing the first sub syndrome and the second sub syndrome; and
correct the multi-bit error and detect the triple bit error based on a summed value obtained by summing syndrome values of the first sub syndrome.

2. The memory controller of claim 1, wherein the ECC decoder is configured to:
estimate a first error vector associated with the symbol error based on comparing the first sub syndrome and the second sub syndrome;
generate a first error flag indicating a result of the first ECC decoding by performing a vector-multiplication operation on the estimated first error vector and a transposition matrix of the parity check matrix;
estimate a second error vector associated with the multi-bit error based on the summed value; and
generate a second error flag associated with whether the multi-bit error is corrected by performing a vector-multiplication operation on the estimated second error vector and the transposition matrix.

3. The memory controller of claim 1, wherein the ECC decoder is configured to:
estimate a first error vector associated with the symbol error based on comparing the first sub syndrome and the second sub syndrome;
generate a first error flag indicating a result of the first ECC decoding by performing a vector-multiplication operation on the estimated first error vector and a transposition matrix of the parity check matrix; and
generate a second error flag indicating whether a single bit error is detected or whether the triple-bit error is detected based on the summed value, the second sub syndrome and the third sub syndrome.

4. The memory controller of claim 1, wherein:
the first sub check matrix includes a plurality of identity sub matrixes and a plurality of zero sub matrixes, the plurality of identity sub matrixes corresponding to a plurality of symbols in the read codeword set, the plurality of zero sub matrixes corresponding to the plurality of identity sub matrixes;

the second sub check matrix includes first alpha matrixes corresponding bits of the plurality of symbols, the first alpha matrixes having exponential values that increase sequentially; and the third sub check matrix includes second alpha matrixes obtained by cubing each of the first alpha matrixes.

5. The memory controller of claim 4, wherein the ECC decoder includes:

a syndrome generator configured to generate the syndrome by performing a vector-multiplication operation on the read codeword set and a transposition matrix of the parity check matrix;

a symbol error correction circuit configured to, in response to the syndrome having a non-zero value, perform the first ECC decoding on the read codeword set by using the first sub check matrix and the second sub check matrix and generate a first error flag indicating whether the symbol error is corrected;

a random error correction circuit configured to, in response to the syndrome having a non-zero value, perform the second ECC decoding on the read codeword set by using the second sub check matrix and the third sub check matrix and generate a second error flag indicating at least one of whether the multi-bit error is corrected, whether the triple-bit error is detected and whether a single bit error is detected; and a decision circuit configured to generate a decision signal indicating a result of the first ECC decoding and a result of the second ECC decoding based on the first error flag and the second error flag, and provide the decision signal to the processor.

6. The memory controller of claim 5, wherein the syndrome generator is configured to:

generate the first sub syndrome based on the read codeword set and the first sub check matrix of the transposition matrix;

generate the second sub syndrome based on the read codeword set and the second sub check matrix of the transposition matrix; and generate the third sub syndrome based on the read codeword set and the third sub check matrix of the transposition matrix.

7. The memory controller of claim 5, wherein the symbol error correction circuit includes:

an error magnitude and error symbol location estimator configured to estimate a magnitude of the symbol error and a location of a target symbol in which the symbol error occurs based on a ratio of the second sub syndrome to the first sub syndrome;

a symbol error corrector configured to generate a corrected user data set by correcting an error of the target symbol among the plurality of symbols of the read codeword set based on location information of the target symbol, and output an estimated first error vector based on the location information of the target symbol and the first sub syndrome; and an error syndrome checker configured to perform a first vector-multiplication operation on the estimated first error vector and the transposition matrix, and generate the first error flag based on a result of the first vector-multiplication operation.

8. The memory controller of claim 7, wherein the error magnitude and error symbol location estimator, in response to a target alpha matrix non-existing in the first alpha matrixes, is configured to output the first error flag indicating that the first ECC decoding has failed, the target alpha matrix matching the ratio of the second sub syndrome to the first sub syndrome.

9. The memory controller of claim 7, wherein, in response to a target alpha matrix existing in the first alpha matrixes, the error magnitude and error symbol location estimator is configured to estimate a symbol as the target symbol, the target alpha matrix matching the ratio of the second sub syndrome to the first sub syndrome, wherein the symbol corresponding to a value obtained by dividing an exponential of the target symbol by a number of bits in each of the plurality of symbols, and wherein the symbol error corrector is configured to output the estimated first error vector by replacing the target symbol with a portion of the first sub syndrome and setting each bit of the plurality of symbols except the target symbol to zero.

10. The memory controller of claim 7, wherein the error syndrome checker is configured to output the first error flag indicating that the first ECC decoding has succeeded, in response to the result of the first vector-multiplication operation matching the syndrome.

11. The memory controller of claim 7, wherein the error syndrome checker is configured to output the first error flag indicating that the first ECC decoding has failed, in response to the result of the first vector-multiplication operation being different from the syndrome.

12. The memory controller of claim 5, wherein the random error correction circuit includes:

a first syndrome value checker configured to determine whether a first summed value of syndrome values of the first sub syndrome is zero or two, and generate a check signal indicating a result of the determination;

a second syndrome value checker configured to:

determine, in response the first summed value not being zero and two, whether the first summed values is one;

output, in response to the first summed value not being one, the second error flag indicating that the triple-bit error is detected; and output, in response to the first summed value being one, the second error flag indicating one of whether the triple-bit error is detected and whether a single bit error is detected based on the second sub syndrome and the third sub syndrome;

a multi-bit error corrector configured to:

estimate, in response to the check signal indicting that the first summed value is zero or two, a location of the multi-bit error based on the second sub syndrome and the third sub syndrome;

generate, based on the estimated location, a corrected user data set by correcting the multi-bit error in the read codeword set;

estimate a second error vector based on the estimated location; and output the estimated second error vector; and an error syndrome checker configured to perform a second vector-multiplication operation on the estimated second error vector and the transposition matrix, and to generate the second error flag based on a result of the second vector-multiplication operation.

13. The memory controller of claim 12, wherein the second syndrome value checker is configured to:

output, in response to a result of cubing the second sub syndrome matching the third sub syndrome, the second error flag indicating that the single bit error is detected; and output, in response to a result of cubing the second sub syndrome being different from the third sub syndrome, the second error flag indicating that the triple-bit error is detected.

14. The memory controller of claim 12, wherein multi-bit error corrector is configured to output the estimated second error vector by setting first bits of locations corresponding to the multi-bit error in the read codeword set to logic high levels and by setting second bits except the first bits in the read codeword set to logic low levels.

15. The memory controller of claim 12, wherein the error syndrome checker is configured to:
output, in response to the result of the second vector-multiplication operation matching the syndrome, the second error flag indicating that a double bit error is corrected; and
output, in response to the result of the second vector-multiplication operation being different from the syndrome, the second error flag indicating that the triple-bit error is detected.

16. The memory controller of claim 1, wherein the ECC engine further includes:
an ECC encoder configured to generate a parity data by performing an ECC encoding on a user data set based on a parity generation matrix, and transmit the user data set and the parity data to the memory module,
wherein the parity generation matrix includes a first sub generation matrix, a second sub generation matrix, and a third sub generation matrix,
wherein the first sub generation matrix includes a plurality of identity sub matrixes and a plurality of zero sub matrixes, the plurality of identity sub matrixes corresponding to a plurality of symbols in the read codeword set, the plurality of zero sub matrixes corresponding to the plurality of identity sub matrixes,
wherein the second sub generation matrix includes first alpha matrixes corresponding bits of the plurality of symbols, the first alpha matrixes having exponential values that increase sequentially, and
wherein the third sub generation matrix includes second alpha matrixes obtained by cubing each of the first alpha matrixes.

17. A memory system comprising:
a memory module that includes a plurality of data chips and at least one parity chip; and
a memory controller configured to control the memory module,
wherein the memory controller includes:
an error correction code (ECC) engine; and
a processor configured to control the ECC engine,
wherein the ECC engine includes an ECC decoder configured to:
perform a first ECC decoding to correct a symbol error in a read codeword set read from the memory module by using a first sub check matrix and a second sub check matrix of a parity check matrix; and
perform a second ECC decoding to correct multi-bit error and to detect triple-bit error in the read codeword set by using the second sub check matrix and a third sub check matrix of the parity check matrix, in parallel with performing the first ECC decoding, wherein the ECC decoder is configured to:
generate a syndrome including a first sub syndrome, a second sub syndrome and a third sub syndrome based on the parity check matrix and the read codeword set;
correct the symbol error based on comparing the first sub syndrome and the second sub syndrome; and
correct the multi-bit error and detect the triple bit error based on a summed value obtained by summing syndrome values of the first sub syndrome.

18. The memory system of claim 17, wherein the ECC decoder is configured to:
estimate a first error vector associated with the symbol error based on comparing the first sub syndrome and the second sub syndrome;
generate a first error flag indicating a result of the first ECC decoding by performing a vector-multiplication operation on the estimated first error vector and a transposition matrix of the parity check matrix;
estimate a second error vector associated with the multi-bit error based on the summed value; and
generate a second error flag associated with whether the multi-bit error is corrected by performing a vector-multiplication operation on the estimated second error vector and the transposition matrix.

19. The memory system of claim 17, wherein the memory controller is configured to control the memory module by communicating with one or more host through a compute express link (CXL) interface,
wherein the first sub check matrix and the second sub check matrix implement Reed-Solomon decoding, and
wherein the second sub check matrix and the third sub check matrix implement Bose-Chaudhuri-Hocquenghem decoding.

20. A memory controller configured to control a memory module including a plurality of data chips and at least one parity chip by communicating with one or more host through a compute express link (CXL) interface, the memory controller comprising:
an error correction code (ECC) engine; and
a processor configured to control the ECC engine,
wherein the ECC engine includes an ECC decoder configured to:
perform a first ECC decoding to correct a symbol error in a read codeword set read from the memory module by using a first sub check matrix and a second sub check matrix of a parity check matrix; and
perform a second ECC decoding to correct multi-bit error and to detect triple-bit error in the read codeword set by using the second sub check matrix and a third sub check matrix of the parity check matrix, in parallel with performing the first ECC decoding, wherein the ECC decoder is configured to:
generate a syndrome including a first sub syndrome, a second sub syndrome, and a third sub syndrome based on the parity check matrix and the read codeword set;
correct the symbol error based on comparing the first sub syndrome and the second sub syndrome; and
correct the multi-bit error and detect the triple bit error based on a summed value obtained by summing syndrome values of the first sub syndrome,
wherein the first ECC decoding corresponds to Reed-Solomon decoding, and wherein the second ECC decoding corresponds to Bose-Chaudhuri-Hocquenghem decoding.

* * * * *